United States Patent
Mihara

(10) Patent No.: US 10,044,870 B2
(45) Date of Patent: Aug. 7, 2018

(54) CONTROL SYSTEM, COMMUNICATIONS TERMINAL, COMMUNICATIONS SYSTEM, CONTROL METHOD, AND RECORDING MEDIUM

(71) Applicant: Akihiro Mihara, Tokyo (JP)

(72) Inventor: Akihiro Mihara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/393,860

(22) Filed: Dec. 29, 2016

(65) Prior Publication Data

US 2017/0111511 A1  Apr. 20, 2017

Related U.S. Application Data

(63) Continuation of application No. PCT/JP2015/070613, filed on Jul. 17, 2015.

(30) Foreign Application Priority Data

Jul. 22, 2014 (JP) ................................ 2014-148644
Apr. 14, 2015 (JP) ................................ 2015-082590

(51) Int. Cl.
*H04M 3/42* (2006.01)
*H04M 3/56* (2006.01)
(Continued)

(52) U.S. Cl.
CPC ......... *H04M 3/563* (2013.01); *H04M 3/5238* (2013.01); *H04M 3/56* (2013.01); *H04W 4/06* (2013.01)

(58) Field of Classification Search
CPC ............................. H04M 3/563; H04M 3/5238
(Continued)

(56) References Cited

U.S. PATENT DOCUMENTS 4,975,944 A   12/1990 Cho
5,537,470 A    7/1996 Lee
(Continued)

FOREIGN PATENT DOCUMENTS

EP   1 564 977 A2   8/2005
EP   1 903 763 A1   3/2008
(Continued)

OTHER PUBLICATIONS

Extended European Search Report dated Jul. 5, 2016 in European Patent Application No. 16155668.3.
(Continued)

*Primary Examiner* — William Deane, Jr.
(74) *Attorney, Agent, or Firm* — Oblon, McClelland, Maier & Neustadt, L.L.P.

(57) ABSTRACT

A control system includes a session controller to control establishing a session for transmitting information between a communications terminal and other communications terminals, in response to a request from the communications terminal, and a start request receiver to receive, after a first session for transmitting information between a first communications terminal and a second communications terminal and a second session for transmitting information between a third communications terminal and a fourth communications terminal have been established, a communications start request for starting communications between the first communications terminal and the fourth communications terminal. When the start request receiver receives the communications start request, the session controller decouples the first session and the second session, and establishes a session for transmitting information between the second communication terminal and the third communications terminal and a session for transmitting information between the first (Continued)

| MANAGEMENT INFORMATION | TERMINAL INFORMATION | STATUS INFORMATION BEFORE CHANGE | STATUS INFORMATION AFTER CHANGE |
|---|---|---|---|
| INVITE | START REQUEST SOURCE | NONE | CALLING |
| | DESTINATION | NONE | RINGING |
| PRIVATE INVITE | START REQUEST SOURCE | NONE | PRIVATE CALLING |
| | DESTINATION | NONE | PRIVATE RINGING |
| ACCEPT | START REQUEST SOURCE | CALLING | ACCEPTED |
| | | PRIVATE CALLING | PRIVATE ACCEPTED |
| | | ACCEPTED | ACCEPTED |
| | | PRIVATE ACCEPTED | PRIVATE ACCEPTED |
| | DESTINATION | RINGING | ACCEPTED |
| | | PRIVATE RINGING | PRIVATE ACCEPTED | communication terminal and the fourth communications terminal.

9 Claims, 35 Drawing Sheets

(51) Int. Cl.
*H04W 4/06* (2009.01)
*H04M 3/523* (2006.01)

(58) Field of Classification Search
USPC .... 379/204.01, 205.01, 206.01, 202.01, 158, 379/201.01
See application file for complete search history.

(56) References Cited

U.S. PATENT DOCUMENTS

| | | | |
|---|---|---|---|
| 6,002,760 A | 12/1999 | Gisby | |
| 6,975,721 B1 | 12/2005 | Nimri et al. | |
| 8,503,313 B1 | 8/2013 | Lang et al. | |
| 8,630,208 B1 * | 1/2014 | Kjeldaas | H04L 12/1822 370/260 |
| 8,769,001 B2 | 7/2014 | Ohwada | |
| 8,782,229 B2 | 7/2014 | Umehara | |
| 8,850,033 B2 | 9/2014 | Umehara et al. | |
| 9,026,596 B2 * | 5/2015 | Perez | H04N 9/8205 345/207 |
| 9,043,399 B2 | 5/2015 | Umehara | |
| 9,185,344 B2 | 11/2015 | Inoue | |
| 9,603,122 B2 * | 3/2017 | Farrell | H04W 68/02 |
| 9,621,722 B2 * | 4/2017 | Krack | H04M 3/4365 |
| 2003/0110408 A1 | 6/2003 | Wells et al. | |
| 2004/0196856 A1 | 10/2004 | Bondarenko | |
| 2005/0182672 A1 | 8/2005 | Hemm et al. | |
| 2006/0030300 A1 | 2/2006 | Nimri et al. | |
| 2007/0015536 A1 | 1/2007 | Labauve et al. | |
| 2008/0037764 A1 | 2/2008 | Lee et al. | |
| 2009/0129295 A1 | 5/2009 | Shibata et al. | |
| 2009/0203375 A1 | 8/2009 | Gisby et al. | |
| 2010/0259593 A1 * | 10/2010 | Beers | H04N 7/142 348/14.09 |
| 2010/0290614 A1 | 11/2010 | Geppert et al. | |
| 2011/0063407 A1 | 3/2011 | Wang | |
| 2012/0027194 A1 | 2/2012 | Deshpande et al. | |
| 2012/0221702 A1 | 8/2012 | Umehara et al. | |
| 2012/0257518 A1 | 10/2012 | Erhart | |
| 2012/0296494 A1 | 11/2012 | Gersabeck et al. | |
| 2014/0033274 A1 | 1/2014 | Okuyama | |
| 2015/0350446 A1 | 12/2015 | Glass | |
| 2016/0105638 A1 | 4/2016 | Pai | |
| 2016/0112562 A1 | 4/2016 | Krack | |
| 2016/0127654 A1 | 5/2016 | Hanson | |
| 2017/0163696 A1 | 6/2017 | Inoue | |

FOREIGN PATENT DOCUMENTS

| | | |
|---|---|---|
| EP | 2 288 152 A1 | 2/2011 |
| JP | H07-038870 | 2/1995 |
| JP | 9-179907 A | 7/1997 |
| JP | 2003-125094 A | 4/2003 |
| JP | 2005-64860 A | 3/2005 |
| JP | 2006-59131 A | 3/2006 |
| JP | 2009-223533 | 10/2009 |
| JP | 2011-205612 A | 10/2011 |
| JP | 2011-217213 | 10/2011 |
| JP | 2011-217261 | 10/2011 |
| JP | 2012-050063 | 3/2012 |
| JP | 2012-191598 | 10/2012 |
| JP | 2014-27433 A | 2/2014 |
| JP | 2014-38522 A | 2/2014 |
| JP | 2014-57127 A | 3/2014 |
| JP | 2014-143534 A | 8/2014 |
| WO | 2015/190368 A1 | 12/2015 |
| WO | WO 2016/035551 A1 | 3/2016 |

OTHER PUBLICATIONS

Extended European Search Report dated May 31, 2016 in Patent Application No. 16154013.3.
International Search Report dated Oct. 20, 2015 in PCT/JP2015/070613 filed on Jul. 17, 2015(with English Translation).
Written Opinion Issued Oct. 20, 2015 in PCT/JP2015/070613 filed on Jul. 17, 2015.
Extended European Search Report dated Jun. 20, 2017 in Patent Application No. 15824790.8.
International Search Report dated Mar. 29, 2016 in PCT/JP2016/050743 (with English language translation).
International Search Report dated Oct. 6, 2015 in PCT/JP2015/070614 (with English language translation).
Extended European Search Report dated Jul. 4, 2017 in Patent Application No. 15825032.4.
Extended European Search Report dated Dec. 13, 2017 in European Patent Application No. 16737341.4, 8 pages.
Office Action dated Aug. 17, 2017 in co-pending U.S. Appl. No. 15/015,417.
Office Action dated Jan. 8, 2018, in co-pending U.S. Appl. No. 15/649,174.

* cited by examiner

FIG.7
| OPERATING STATUS | VISUAL INFORMATION (ICON) |
|---|---|
| ONLINE (COMMUNICATIONS AVAILABLE) |  |
| ONLINE (COMMUNICATIONS IN PROGRESS) |  |
| OFFLINE |  |
FIG.8A
| COMMUNICATIONS ID | PASSWORD |
|---|---|
| 01aa | aaaa |
| 01ab | abab |
| 01ba | baba |
| ... | ... |

FIG.8B

| COMMUNI-CATIONS ID | DESTINATION NAME (TERMINAL NAME) | OPERATING STATUS | COMMUNICATIONS STATUS | TERMINAL IP ADDRESS |
|---|---|---|---|---|
| 01aa | AA TERMINAL | ONLINE (COMMUNICATIONS AVAILABLE) | NONE | 1.2.1.3 |
| 01ab | AB TERMINAL | OFFLINE | ... | 1.2.1.4 |
| ... | ... | ... | ... | ... |
| 01ba | BA TERMINAL | ONLINE (COMMUNICATIONS IN PROGRESS) | PRIVATE CALLING | 1.2.2.3 |
| ... | ... | ... | ... | ... |
| 01cb | CB TERMINAL | OFFLINE | ... | 1.3.1.4 |
| ... | ... | ... | ... | ... |
| 01db | CALL CENTER DB TERMINAL | ONLINE (COMMUNICATIONS IN PROGRESS) | PRIVATE BUSY | 1.3.2.4 |
| ... | ... | ... | ... | ... |

FIG.8C

| COMMUNICATIONS ID \ APPLICATION ID | a001 | a002 | a003 | a004 |
|---|---|---|---|---|
| 01aa | ON | ON | ... | ... |
| 01ab | ON | OFF | ... | ... |
| 01ac | ON | ON | ... | ... |
| ... | ... | ... | ... | ... |

FIG.8D

| START REQUEST SOURCE COMMUNICATIONS ID | DESTINATION COMMUNICATIONS ID |
|---|---|
| 01aa | 01ab, 01ad, ... |
| 01ab | 01aa |
| 01ba | 01aa, 01ab, ... |
| 01cb | ... |
| 01db | 01aa, 01ab, ... |
| ... | ... |

FIG.8E

| SESSION ID | RELAY APPARATUS ID | ATTENDING TERMINAL COMMUNICATIONS ID |
|---|---|---|
| se1 | 111e | 01aa, 01db |
| se2 | 111b | 01ca, 01da |
| se3 | 111c | 01cd, 01cf |
| ... | ... | ... ... |

FIG.9A

| MANAGEMENT INFORMATION | STATUS INFORMATION BEFORE CHANGE | STATUS INFORMATION AFTER CHANGE |
|---|---|---|
| CALL | NONE | ACCEPTED |
| JOIN | ACCEPTED | BUSY |
| | PRIVATE ACCEPTED | PRIVATE BUSY |
| LEAVE | BUSY | NONE |
| | PRIVATE BUSY | NONE |

FIG.9B

| MANAGEMENT INFORMATION | TERMINAL INFORMATION | | STATUS INFORMATION BEFORE CHANGE | STATUS INFORMATION AFTER CHANGE |
|---|---|---|---|---|
| INVITE | START REQUEST SOURCE | | NONE | CALLING |
| | DESTINATION | | NONE | RINGING |
| PRIVATE INVITE | START REQUEST SOURCE | | NONE | PRIVATE CALLING |
| | DESTINATION | | NONE | PRIVATE RINGING |
| ACCEPT | START REQUEST SOURCE | | CALLING | ACCEPTED |
| | | | PRIVATE CALLING | PRIVATE ACCEPTED |
| | | | ACCEPTED | ACCEPTED |
| | | | PRIVATE ACCEPTED | PRIVATE ACCEPTED |
| | DESTINATION | | RINGING | ACCEPTED |
| | | | PRIVATE RINGING | PRIVATE ACCEPTED |

FIG.9C

| GROUP COMMUNICATIONS ID | DESTINATION NAME (GROUP NAME) | GROUP-CONSTITUTING TERMINAL COMMUNICATIONS ID |
|---|---|---|
| 01xx | CALL CENTER | 01da, 01db |
| ... | ... | ... |

FIG.9D

| GROUP COMMUNICATIONS ID | OPERATING STATUS |
|---|---|
| 01xx | ONLINE |
| ... | ... |

FIG.9E

| GROUP COMMUNICATIONS ID | STANDBY TERMINAL COMMUNICATIONS ID | RECEIVED TIME |
|---|---|---|
| 01xx | 01ag | 10:30 |
| 01xx | 01aa | 10:35 |
| ... | ... | ... |

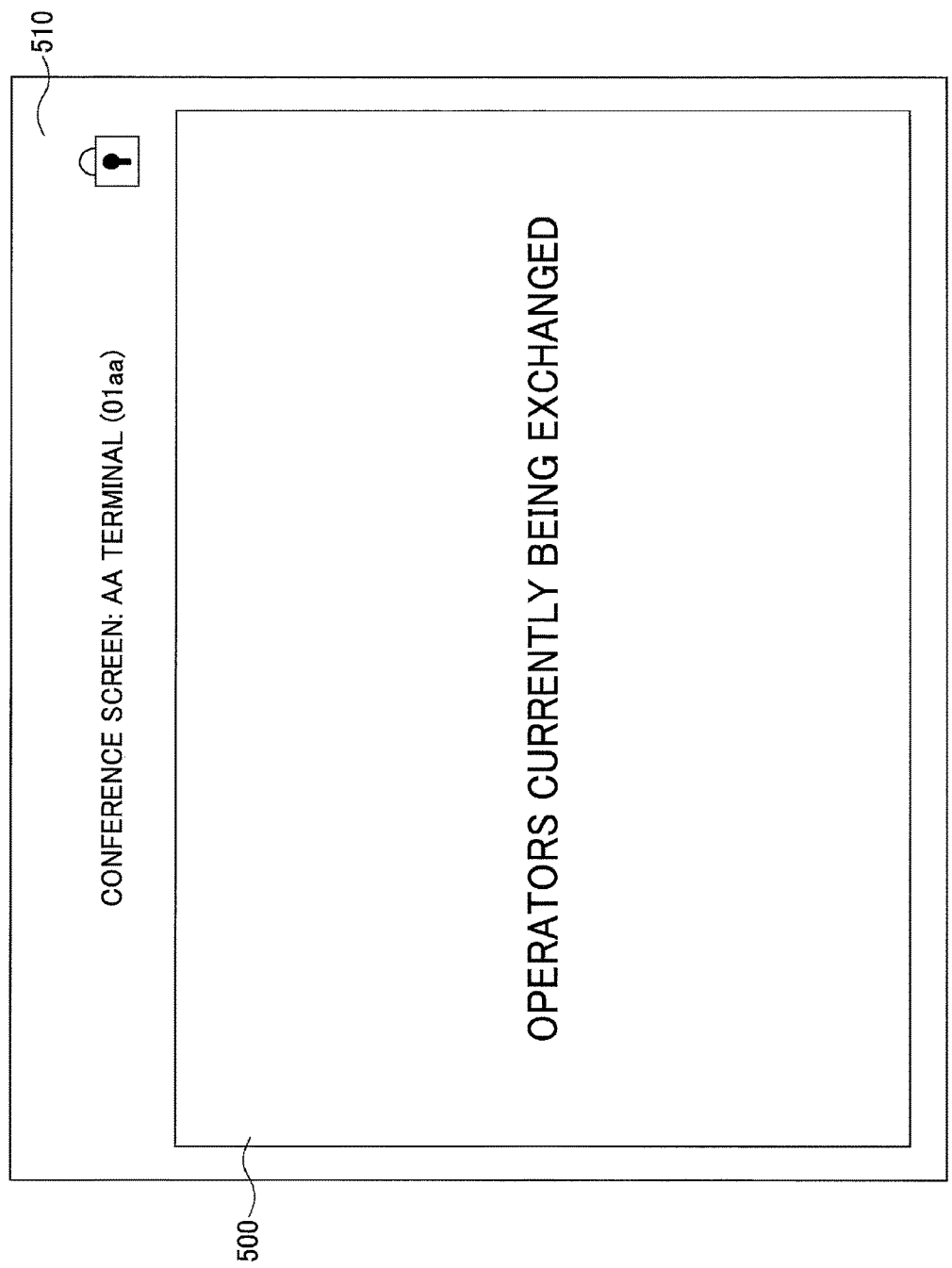

CONTROL SYSTEM, COMMUNICATIONS TERMINAL, COMMUNICATIONS SYSTEM, CONTROL METHOD, AND RECORDING MEDIUM

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2015/070613 filed on Jul. 17, 2015, which is based upon and claims the benefit of priority of the prior Japanese Patent Application No. 2014-148644 filed on Jul. 22, 2014, and the prior Japanese Patent Application No. 2015-082590 filed on Apr. 14, 2015, with the Japanese Patent Office, the entire contents of which are hereby incorporated by reference.

BACKGROUND OF THE INVENTION

1. Field of the Invention

An aspect of the following disclosure relates to a control system, a communications terminal, a communications system, a control method, and a recording medium.

2. Description of the Related Art

Communications systems that implement videoconferencing and telephone calling through communications networks including the Internet, leased lines, etc., have been widely used along with a request for the reduction in cost and time of people's business travels. Such communications systems may allow terminals of users to transmit or receive content data such as image data and audio data between the terminals to start communications between terminals, thereby implementing videoconferencing or telephone calls (see Patent Document 1).

In industrial application, the communications system is provided with a switching apparatus to forward a call established for a certain phone terminal to another phone terminal.

The above-described communications system may be used for reception at a call center. For example, when an operator who has received an incoming call finds it difficult to handle the call due to language or content of the call, the operator may select a forwarding destination capable of handling the call then request forwarding the received call to the forwarding destination. When the forwarding destination is engaged with another call, the operator may have the caller wait until the forwarding destination is available, and then forward the call to the forwarding destination.

RELATED-ART DOCUMENT

Patent Document

Patent Document 1: Japanese Unexamined Patent Application Publication No. 2012-191598

However, there is a case where a first session for transmitting information between a first communications terminal and a second communications terminal, and a second session for transmitting information between a third communications terminal and a fourth communications terminal have been established; subsequently new communications are attempted to be started between the second communications terminal and the third communications terminal. In this case, the waiting time for the second communications terminal may become longer by elongating the communications between the third communications terminal and the fourth communications terminal.

SUMMARY OF THE INVENTION

According to an aspect of the disclosure, a control system includes a session controller configured to control establishing a session for transmitting information between a communications terminal and other communications terminals, in response to a request from the communications terminal; and a start request receiver configured to receive, after a first session for transmitting information between a first communications terminal and a second communications terminal and a second session for transmitting information between a third communications terminal and a fourth communications terminal have been established, a communications start request for starting communications between the first communications terminal and the fourth communications terminal. In the control system, when the start request receiver receives the communications start request, the session controller decouples the first session and the second session, and the session controller establishes a session for transmitting information between the second communication terminal and the third communications terminal and a session for transmitting information between the first communication terminal and the fourth communications terminal.

BRIEF DESCRIPTION OF THE DRAWINGS

Other objects and further features of embodiments will be apparent from the following detailed description when read in conjunction with the accompanying drawings, in which:

FIG. 7 is a conceptual diagram illustrating a visual information management table;

FIG. 8A is a conceptual diagram illustrating an authentication management table;

FIG. 8B is a conceptual diagram illustrating a terminal management table;

FIG. 8C is a conceptual diagram illustrating an application availability management table;

FIG. 8D is a conceptual diagram illustrating a destination list management table;

FIG. 8E is a conceptual diagram illustrating a session management table;

FIG. 9A is a conceptual diagram illustrating a status change management table;

FIG. 9B is another conceptual diagram illustrating the status change management table;

FIG. 9C is a conceptual diagram illustrating a group information management table;

FIG. 9D is a conceptual diagram illustrating a group status management table;

FIG. 9E is a conceptual diagram illustrating a standby information management table;

FIG. 31 is a diagram illustrating a display example of a display.

DETAILED DESCRIPTION OF THE PREFERRED EMBODIMENTS

The following illustrates an embodiment of the present invention with reference to accompanying drawings. In the following description, a "communications terminal" may be referred to simply as a "terminal", and a "communications management system" may be referred to simply as a "management system".

Overall Configuration of Communications System 1

Figure 1:
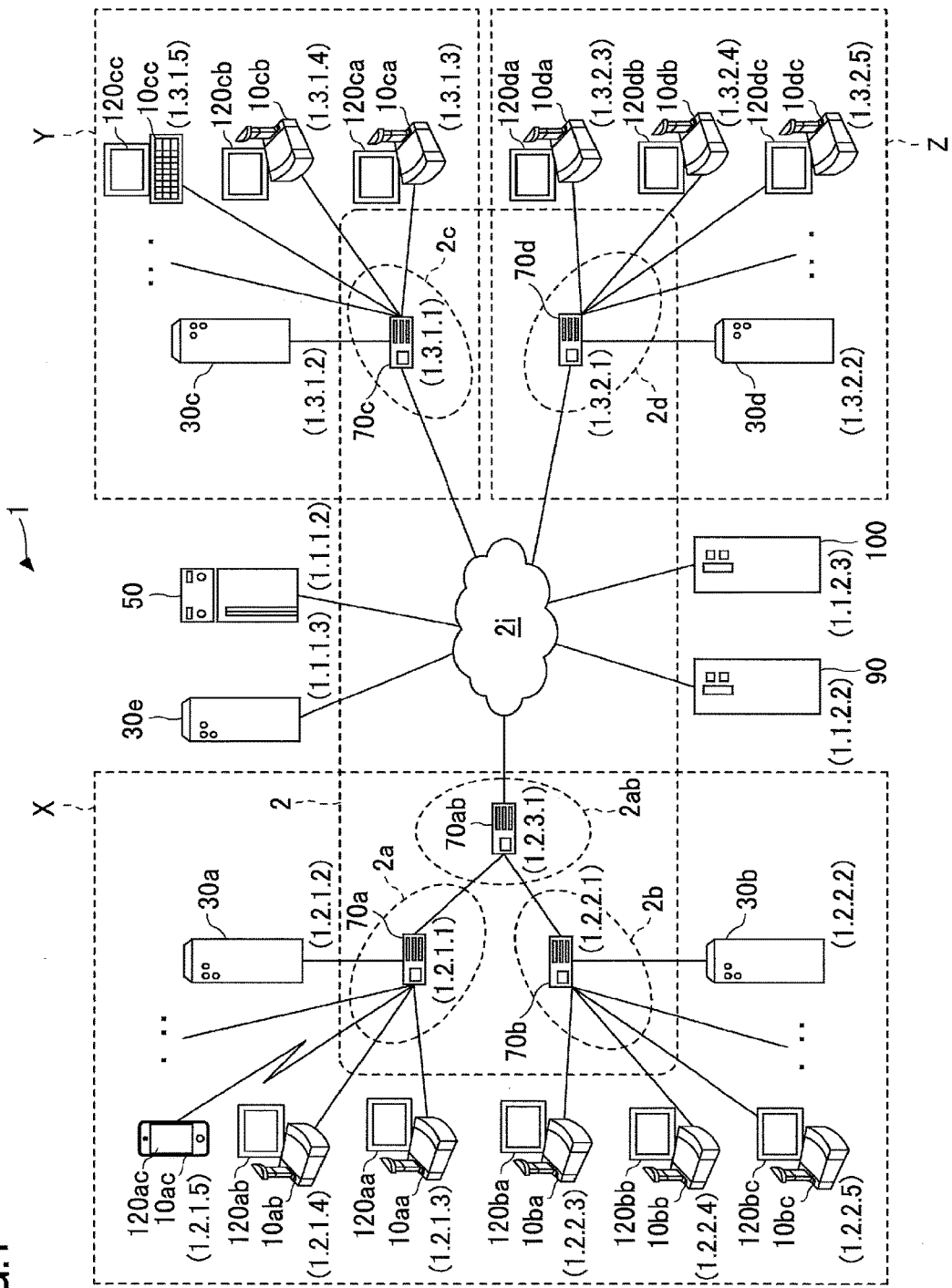
FIG. 1 is a schematic diagram illustrating a communications system according to an embodiment.

FIG. 1 is a schematic diagram illustrating a communications system according to an embodiment. The communications system 1 is configured to include two or more terminals (10aa, 10ab, . . . ), respective displays (120aa, 120ab, . . . ) of the terminals (10aa, 10ab, . . . ), two or more relay apparatuses (30a, 30b, 30c, 30d and 30e), a management system 50, a program providing system 90, and a maintenance system 100. The communications system 1 may be able to implement videoconferencing or the like between remote locations by communicating image data and sound data as examples of content data. Note that two or more routers (70a, 70b, 70c, 70d and 70ab) are configured to select an optimal one of routes for the content data.

The terminals (10aa, 10ab, 10ac, . . . ), the relay apparatus 30a, and the router 70a are coupled to one another via a LAN 2a such that the terminals (10aa, 10ab, 10ac, . . . ), the relay apparatus 30a, and the router 70a may be able to perform communications with one another. The terminals (10ba, 10bb, 10bc, . . . ), the relay apparatus 30b, and the router 70b are coupled to one another via a LAN 2b such that the terminals (10ba, 10bb, 10bc, . . . ), the relay apparatus 30b, and the router 70b may be able to perform communications with one another. The LAN 2a and LAN 2b are coupled via a leased line 2ab including a router 70ab to perform communications with one another. The LAN 2a and LAN 2b and leased line 2ab are constructed within a predetermined area X. Note that the above-described apparatuses are not necessarily coupled via the leased line but may be coupled directly to the Internet, for example.

The terminals (10ca, 10cb, 10cc, . . . ), the relay apparatus 30c, and the router 70c are coupled to one another via a LAN 2c such that the terminals (10ca, 10cb, 10cc, . . . ), the relay apparatus 30c, and the router 70c may be able to perform communications with one another. The LAN 2 is constructed within a predetermined area Y.

The terminals (10da, 10dd, 10dc, . . . ), the relay apparatus 30d, and the router 70d are coupled to one another via a LAN 2d such that the terminals (10da, 10dd, 10dc, . . . ), the relay apparatus 30d, and the router 70d may be able to perform communications with one another. The LAN 2d is constructed within a predetermined area Z. The areas X, Y, and Z may be situated within the same country or may be situated in different countries.

The areas X, Y, and Z are coupled via the Internet 2i from the routers 70ab, 70c and 70d, respectively, such that the areas X, Y, and Z may be able to perform communications with one another. Note that the area Z includes a call center. The terminals 10 may be coupled to call center terminals (10da, 10db, 10dc, . . . ) so as to receive a reception service.

In the following description, any one of the terminals (10aa, 10ab, . . . ) is referred to as a "terminal 10", any one of the displays (120aa, 120ab, . . . ) is referred to as a "display 120", and any one of the relay apparatuses (30a, 30b, 30c, 30d and 30e) is referred to as a "relay apparatus 30". Note also that, any one of the routers (70a, 70b, 70c, 70d and 70ab) is referred to as a "router 70".

The management system 50, the program providing system 90, and the maintenance system 100 are coupled to the Internet 2i. The management system 50, the program providing system 90, and the maintenance system 100 may be installed in the areas X, Y, and Z, or may be installed in areas other than the areas X, Y, and Z.

Note that the LANs (2a, 2b, 2c and 2d), the leased line tab, and the Internet 2i form a communications network 2 of the embodiment. The communications network 2 not only includes wired communications but partially includes wireless communications such as Wireless Fidelity (WiFi), Bluetooth (registered trademark), and mobile telephone networks.

In FIG. 1, a combination of four numbers provided beneath each of the terminal 10, the relay apparatus 30, the management system 50, the router 70, the program providing system 90, and the maintenance system 100 simply represents an IP address of a general IPv4. The IP address may be IPv6 instead of IPv4; however, the IPv4 is employed in this specification for simplifying the illustration.

The terminals 10 enables, upon activation of the later-described application, communications between users by transmitting and receiving content data including sound data and image data. The terminals 10 are configured to transmit and receive communications data utilizing predetermined communications systems including a call control system for coupling to and decoupling from a communications destination and an encoding system for IP packeting the communications data. Note that in the following description, application software may be called an "application" or "applications".

Examples of the call control system include (1) the session initiation protocol (SIP), (2) H.323, (3) an extended SIP protocol, (4) instant messaging protocols and (5) SIP for instant messaging, (6) Internet Relay Chat (IRC) protocol, and (7) extended instant messaging protocols. Among the above-described protocols, (4) the instant messaging protocols may be (4-) Extensible messaging and presence protocol (XMPP), or (4-2) protocols for use in ICQ (registered trademark), AIM (registered trademark), or Skype (registered trademark). In addition, (7) the extended instant messaging protocols may be Jingle.

Hardware Configuration of Embodiment

Figure 2:
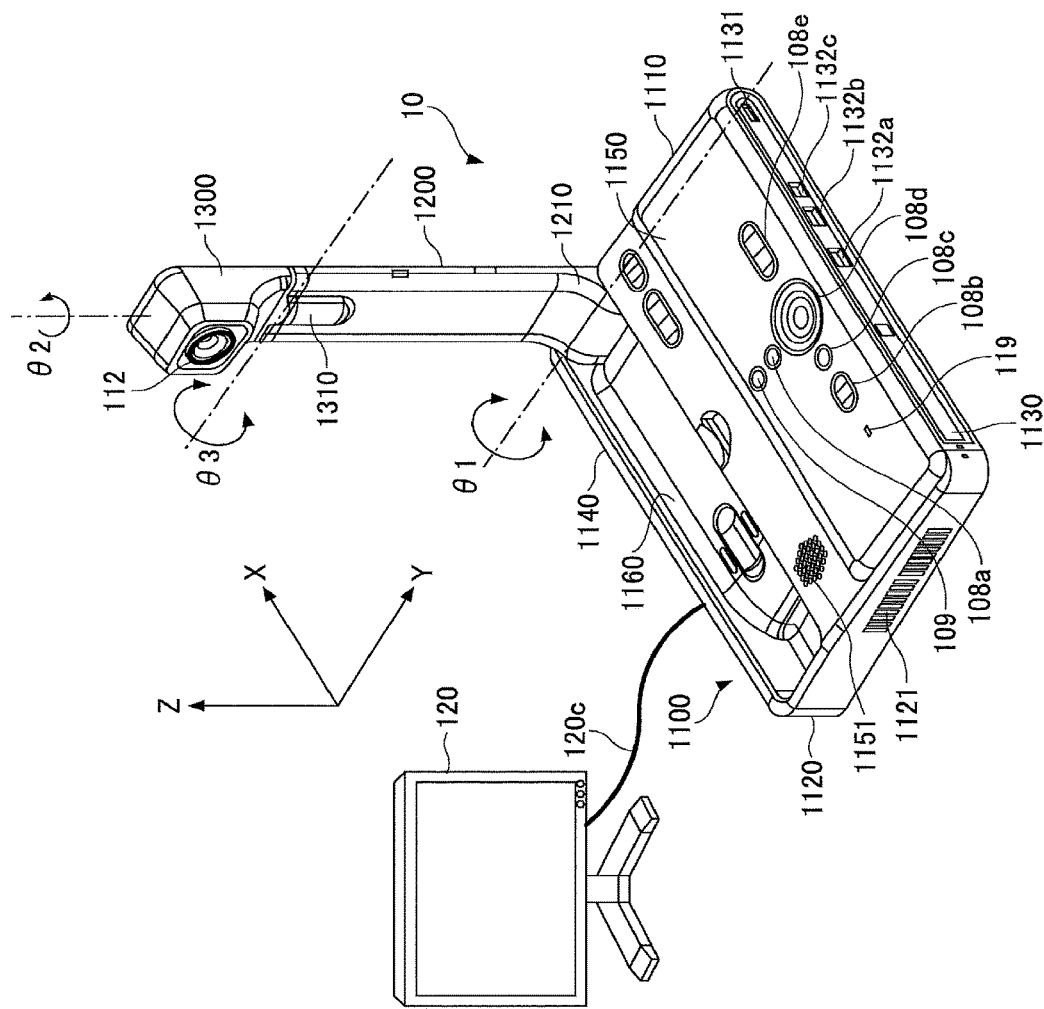
FIG. 2 is an external view illustrating a terminal according to an embodiment.

The following describes hardware configurations of the embodiment. FIG. 2 is an external view illustrating a terminal 10 according to an embodiment. The terminal 10 includes, as illustrated in FIG. 2, a housing 1100, an arm 1200, and a camera housing 1300. The housing 1100 includes a not-illustrated suction surface formed of multiple suction holes in a front wall 1110 of the housing 1100, and a rear wall 1120 having an emission surface 1121 formed of multiple emission holes. The housing 1100 having the above-described configuration may be able to drive a built-in cooling fan in the housing 1100 to suction external air from a front side of the terminal 10 via the not-illustrated suction surface and to emit air via the emission surface 1121 to the rear side of the terminal 10. The housing 1100 includes a sound-pickup hole 1131 in a right wall 1130 of the housing 1100 such that voice, sound, noise, and the like may be picked up from a later-described built-in microphone 114 via the sound-pickup hole 1131.

The housing 1100 includes an operations panel 1150 on a right wall 1130 side of the housing 1100. The operations panel 1150 includes later-described operations buttons (108a to 108e), a later-described power switch 109, a later-described alarm lamp 119, and a sound output surface 1151 formed of sound output holes for outputting sound from a later-described built-in speaker 115. The housing 1100 further includes a holder 1160 configured to house the arm 1200 and the camera housing 1300 as a recess part in a left wall 1140 side of the housing 1100. The housing 1100 includes multiple connector ports (1132a to 1132c) for electrically coupling cables with respect to a later-described external apparatus coupling I/F 118. The housing 1100 includes a not-illustrated coupling port in a left wall 1140 of the housing 1100 for electrically coupling a cable 120c of a display 120 to the later-described external apparatus coupling I/F 118.

Note that in the following description, an "operations button 108" indicates any one of the operations buttons (108a to 108e), and an "coupling port 1132" indicates any one of the coupling ports (1132a to 1132c).

Next, the arm 1200 is attached to the housing 1100 via a torque hinge 1210 to allow the arm 1200 to turn in a vertical direction (upward and downward directions) within a 135 degree range of a tilt angle θ1 with respect to the housing 1100. FIG. 2 illustrates an example of the tilt angle θ1 being 90 degrees. The camera housing 1300 includes a later-described built-in camera 112 configured to image users, documents, rooms, and the like. The camera housing 1300 also includes a torque hinge 1310. The camera housing 1300 is attached to the arm 1200 via the torque hinge 1310. The camera housing 1300 is configured to turn in a horizontal direction by ±180 degrees within a range of a pan angle θ2 from 0 degrees being the camera housing 1300 illustrated in FIG. 2 with respect to the arm 1200 and turn in a vertical direction by ±45 degrees within a range of a tilt angle θ3.

Note that the external view of the terminal 10 illustrated in FIG. 2 is only an example, and the external view is thus not limited to this example. For example, the terminal 10 may be a general purpose computer, a mobile terminal, a projector, an electronic whiteboard, digital signage, and the like (see terminals (10ac and 10cc) of FIG. 1). When a computer used as the terminal 10 does not include a microphone or a camera, an externally provided microphone or an externally provided camera may be coupled to the computer. When the terminal 10 is a general purpose computer or a mobile phone terminal, the terminal 10 may be coupled to the Internet 2i via wireless communications by a wireless LAN or a mobile phone network. Further, when the general-purpose computer is used as the terminal 10, the terminal 10 may install application programs (hereinafter called "applications") for causing the computer to execute processes of the terminal 10.

Note that external views of the relay apparatus 30, the management system 50, the program providing system 90, and the maintenance system 100 may be similar to external views of general server computers, and a duplicated illustration of the external views of the relay apparatus 30, the management system 50, the program providing system 900, and the maintenance system 100 are omitted from the description.

Figure 3:
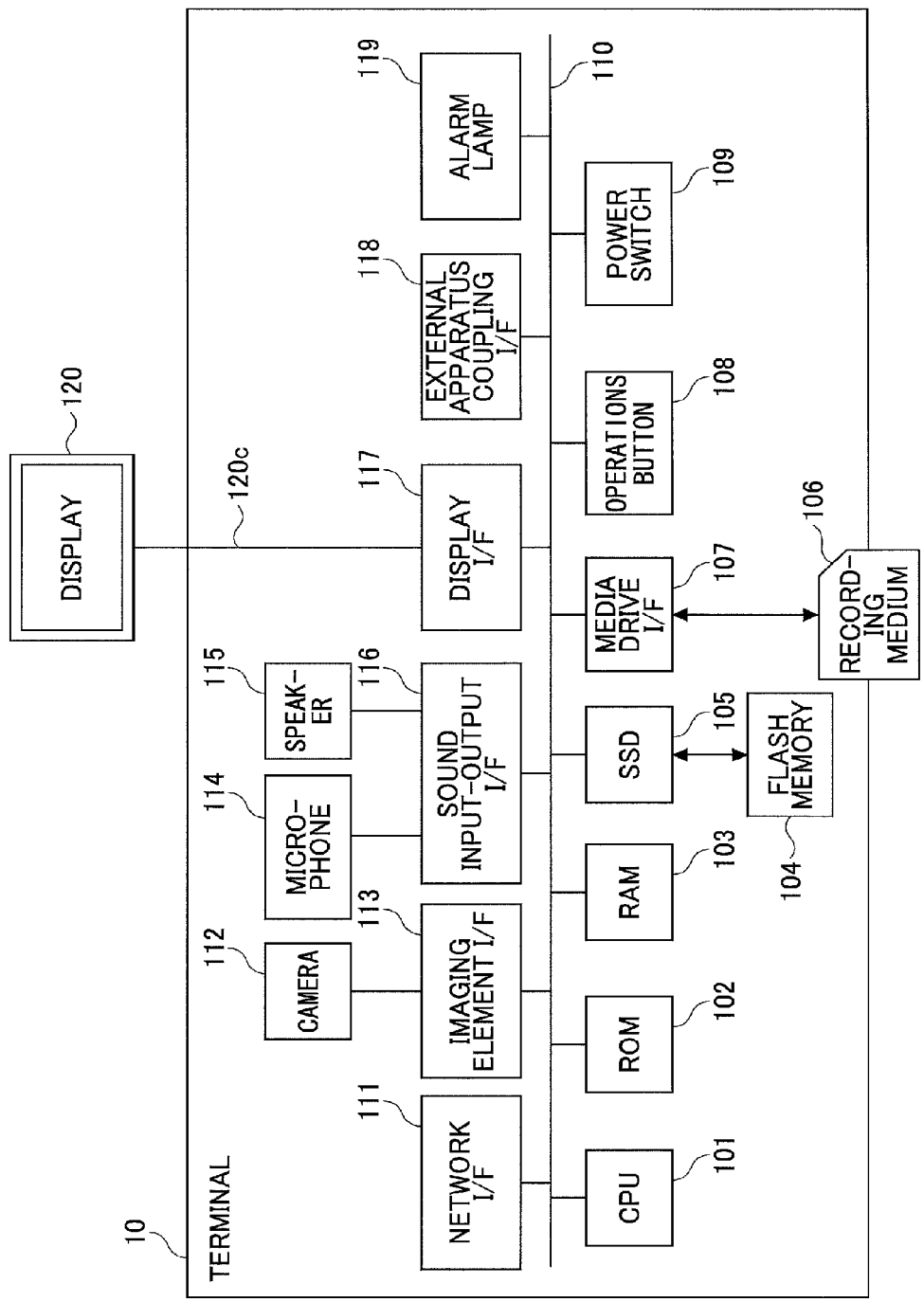
FIG. 3 is a hardware configuration diagram illustrating a terminal according to an embodiment.

FIG. 3 is a hardware configuration diagram of the terminal 10 according to an embodiment. The terminal 10 includes a central processing unit (CPU) 101 configured to control overall operations of the terminal 10, a read only memory (ROM) 102 storing programs for driving the CPU 101 such as initial program loader (IPL), a random access memory (RAM) 103 serving as a work area of the CPU 101, a flash memory 104 storing various types of data such as terminal programs, image data and sound data, a solid state drive (SDD) 105 configured to control reading or writing various types of data with respect to the flash memory 104 based on the control of the CPU 101, a media drive 107 configured to control reading or writing (storing) data with respect to a recording medium 106 such as a flash memory and an integrated circuit (IC) card, an operations button 108 configured to be operated for selecting a destination for the terminal 10, a power switch 109 configured to switch ON/OFF the power supply of the terminal 10, and a network interface (I/F) 111 for transmitting data using the communications network 2.

The terminal 10 further includes a built-in camera 112 configured to image a subject to acquire image data in accordance with the control of the CPU 101, an imaging element I/F 113 configured to control the drive of the camera 112, a built-in microphone 114 configured to collect sound, a built-in speaker 115 configured to output sound, a sound input I/F 116 configured to process input sound signals and output sound signals between the microphone 114 and the speaker 115 in accordance with the control of the CPU 101, a display I/F 117 configured to transmit image data to an externally attached display 120 in accordance with the control of the CPU 101, an external apparatus coupling I/F 118 for coupling various types of external apparatuses, an alarm lamp 119 configured to report abnormalities of various functions of the terminal 10, and a bus line 110 such as an address bus or a data bus for electrically coupling the above-described components illustrated in FIG. 3.

The display 120 serves as a display part configured to display images or the like of a subject. An example of the display 120 includes a liquid crystal display or an organic electroluminescence display. The display 120 is coupled to the display I/F 117 via a cable 120c. The cable 120c may be an analog RGB (VGA) signal-specific cable, a component video-specific cable, a high-definition multimedia interface (HDMI) (registered trademark) or a digital video interactive (DVI) signal-specific cable.

The camera 112 includes lenses or a solid-state image sensor configured to convert light capturing a subject into electric charges to transform an image (video) of the subject into electronic data. Examples of the solid-state image sensor include a complementary metal oxide semiconductor (CMOS) or a charge coupled device (CCD).

External apparatuses such as an externally provided camera, an externally provided microphone, and an externally provided speaker may be electrically coupled to the external apparatus coupling I/F 118 via a universal serial bus (USB) cable or the like inserted in a connector port 1132 of the housing 1100 of the terminal 10. When the externally provided camera is coupled to the external apparatus coupling I/F 181, the externally provided camera is driven in preference to the built-in camera 112 in accordance with the control of the CPU 101. Similarly, when the externally provided microphone or the externally provided speaker is coupled to the external apparatus coupling I/F 181, the externally provided microphone or the externally provided speaker coupled to the external apparatus coupling I/F 181 is driven in preference to a corresponding one of the built-in microphone 114 and the built-in speaker 115 in accordance with the control of the CPU 101.

Note that the recording medium 106 is configured to be removable from the terminal 10. Further, when the recording medium 106 is a nonvolatile memory configured to read or write data in accordance with the control of the CPU 101, such a nonvolatile memory used as the medium 106 is not limited to the flash memory 104. The nonvolatile memory used as the medium 106 may be an electrically erasable and programmable ROM (EEPROM), or the like.

Figure 4:
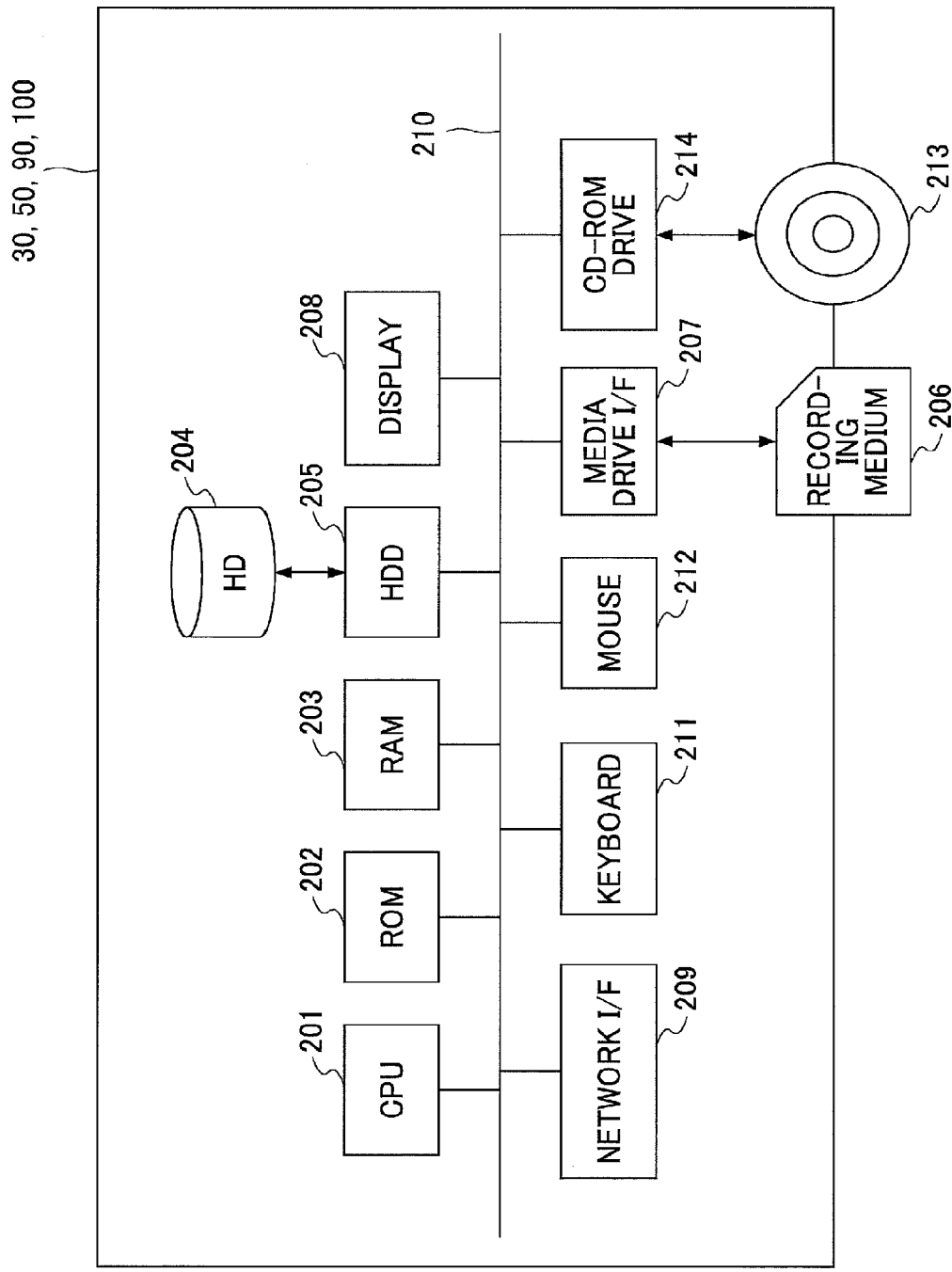
FIG. 4 is a hardware configuration diagram illustrating a management system, a relay apparatus, a program providing system, and a maintenance system according to an embodiment.

FIG. 4 is a hardware configuration diagram of the management system 50 according to an embodiment. The management system 50 includes a CPU 201 configured to control overall operations of the management system 50, a ROM 202 configured to store a program for use in driving the CPU 201 such as an IPL, a RAM 203 configured to serve as a work area of the CPU 201, an HD 204 configured to store various types of data specific to the management system 50, a hard disk drive (HDD) 205 configured to control reading or writing the data with respect to the HD 204 in accordance of the control of the CPU 201, a media I/F 207 configured to control reading or writing (storing) data with respect to a recording medium 206 such as flash memory or the like, a display 208 configured to display various types of information such as a cursor, menus, windows, characters, or images, a network I/F 209 configured to perform data communications using the communications network 2, a keyboard 211 provided with multiple keys for inputting characters, numeric values, various types of instructions and the like, a mouse 212 configured to select or execute various types of instructions, select a process target and move a cursor, a CD-ROM drive 214 configured to control reading or writing data with respect to a compact disc read only memory (CD-ROM) 213 as an example of a removable recording medium, and a bus line 210 such as an address bus or a data bus for electrically coupling the above-described components as illustrated in FIG. 4.

The relay apparatus 30, the program providing system 90 and the maintenance system 100 have a hardware configuration similar to the hardware configuration of the management system 50, and hence, a duplicated illustration of the relay apparatus 30, the program providing system 90 and the maintenance system 100 is omitted from the description.

Figure 5:
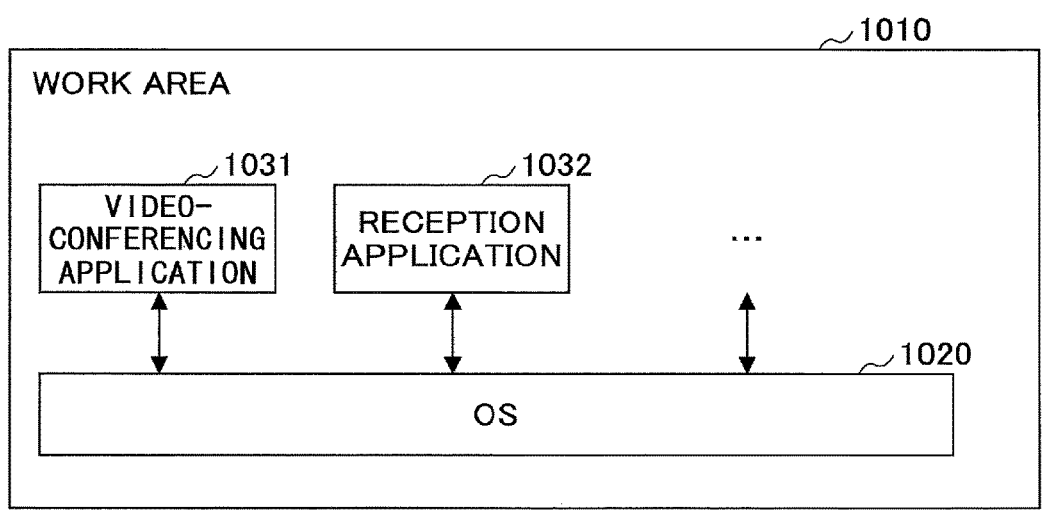
FIG. 5 is a software configuration diagram illustrating a terminal according to an embodiment.

FIG. 5 is a software configuration diagram of the terminal 10 according to an embodiment. As illustrated in FIG. 5, an OS 1020, a videoconferencing application 1031, and a reception application 1032 operate on a work area 1010 of the RAM 103. The OS 1020, the videoconferencing application 1031 and the reception application 1032 are installed on the terminal 10.

The OS 1020 provides basic functions to serve as basic software to manage the overall terminal 10. The videoconferencing application 1031 is configured to couple the terminal 10 to another terminal 10 to conduct videoconferencing. The reception application 1032 is configured to couple the terminal 10 to a call center terminal 10 to allow a user of the terminal 10 to talk to an operator.

The above-described applications are only examples and other applications may also be installed on the terminal 10. Other applications may be stored in the program providing system 90, and these applications may be downloaded from the program providing system 90 in response to a request from the terminal 10. To install multiple videoconferencing applications in the terminal 10, the videoconferencing applications having different protocols may be installed in the terminal 10, as (1) to (7) noted above.

Functional Configurations of Embodiment

Figure 6:
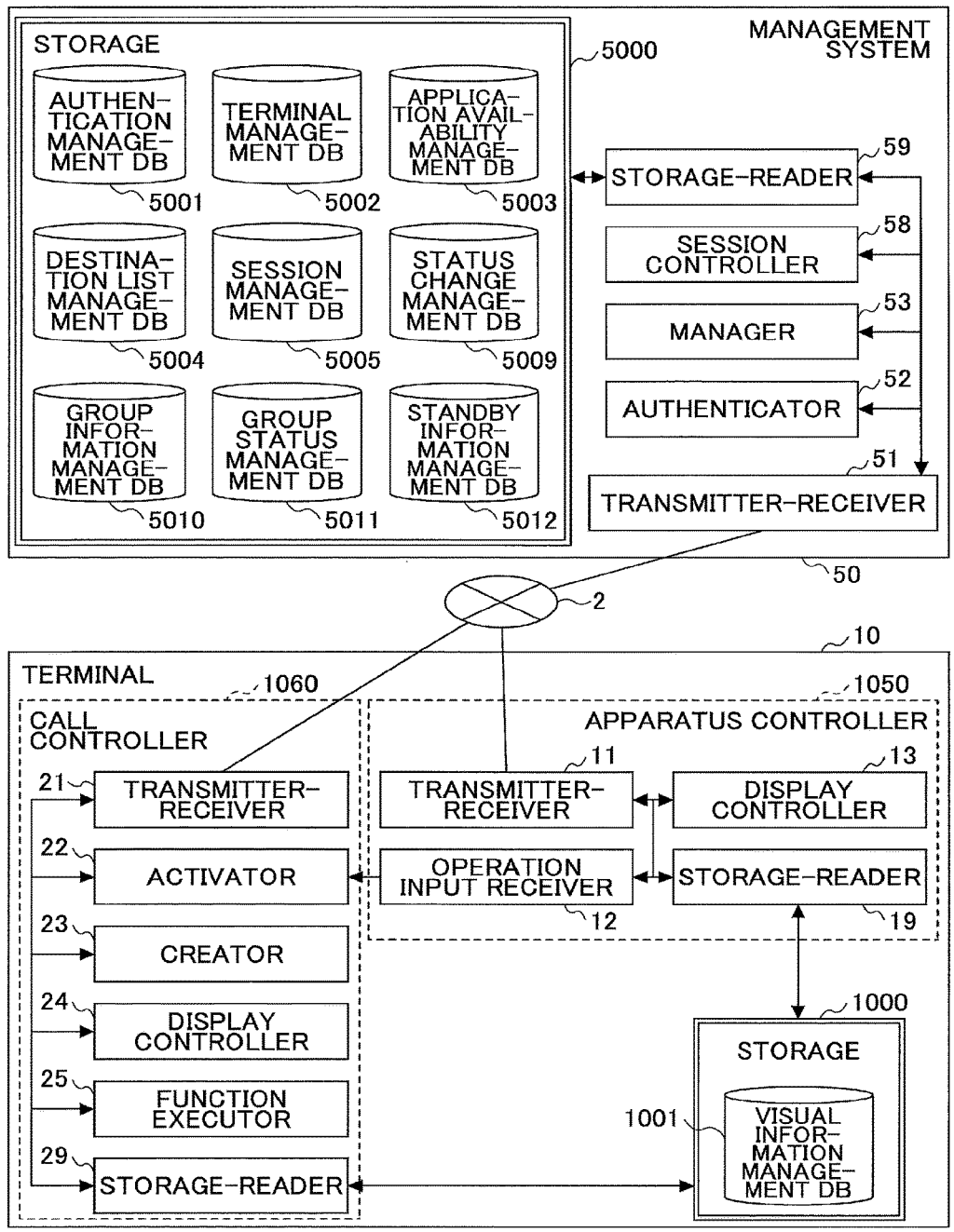
FIG. 6 is a functional block diagram illustrating a management system and a terminal constructing a communications system according to an embodiment.

The following describes functional configurations of the communications system 1 according to one embodiment. FIG. 6 is a functional block diagram illustrating a configuration of the terminal 10 and a configuration of the management system 50 that partially form the communications system 1 of the embodiment. In FIG. 6, the terminal 10 and the management system 50 are coupled via the communications network 2 to perform data communications with each other.

Functional Configuration of Terminal

The terminal 10 includes an apparatus controller 1050 and a call controller 1060. The apparatus controller 1050 may be implemented by the execution of the OS 1020. The call controller 1060 may be implemented by the activation of the videoconferencing application 1031 or the reception application 1032.

The apparatus controller 1050 includes a transmitter-receiver 11, an operation input receiver 12, a display controller 13, and a storage-reader 19. The above-described components are functions implemented by causing any one of the components illustrated in FIG. 3 to execute instructions from the CPU 101 in accordance with the terminal programs loaded from the flash memory 104 in the RAM 103.

The call controller 1060 includes a transmitter-receiver 21, an activator 22, a creator 23, a display controller 24, a function executor 25, and a storage-reader 29. The above-described components are functions implemented by causing any one of the components illustrated in FIG. 3 to execute instructions from the CPU 101 in accordance with the videoconferencing application 1031 or the reception application 1032 (programs) loaded from the flash memory 104 in the RAM 103.

The terminal 10 includes a storage 1000 formed of the ROM 102, the RAM 103, and the flash memory 104 illustrated in FIG. 3. The storage 1000 stores a visual information management database (DB) 1001 formed of a later-described visual information management table.

Visual Information Management Table

FIG. 7 is a conceptual diagram illustrating a visual information management table. The visual information management table is configured to manage operating statuses of the terminals 10 in association with operating status icon data presented as visual information on the destination list displayed on the display 120. Various types of icons illustrated in FIG. 7 may represent examples of the operating status icons. The operating status includes an ONLINE (communication capable), ONLINE (communications in progress), and OFFLINE.

Functional Configuration of Apparatus Controller

The following describes functional configurations of the apparatus controller 1050 of the terminal 10. Note that the illustration given below also includes a relationship between the main components among those components illustrated in FIG. 3 and the apparatus controller 1050 for implementing the respective functional configurations of the apparatus controller 1050 of the terminal 10.

The transmitter-receiver 11 is implemented by instructions from the CPU 101 and the network I/F 111, and configured to perform transmission and reception of various types of data (or information) with communications counterpart terminals, apparatuses, or systems via the communications network 2.

The operation input receiver 12 is implemented by instructions from the CPU 101, and operations buttons (108a, 108b, 108c, 108d and 108e) and the power switch 109, and is configured to receive various types of inputs or various types of selections made by the user.

The display controller 13 is implemented by instructions from the CPU 101 and the display I/F 117, and is configured to control display of images on the display 120.

The storage-reader 19 is implemented by instructions from the CPU 101 and the SSD 105, and is configured to store various types of data in the storage 1000 or read various types of data from the storage 1000.

Functional Configuration of Communications Controller

The following describes functional configurations of a call controller 1060 of the terminal 10. Note that the illustration given below also includes a relationship between the main components among those components illustrated in FIG. 3 and the call controller 1060 of the terminal 10 for implementing the respective functional configurations of the call controller 1060 of the terminal 10.

The transmitter-receiver 21 is implemented by instructions from the CPU 101 and the network I/F 111, and configured to perform transmission and reception of various types of data (or information) with communications counterpart terminals, apparatuses, or systems via the communications network 2.

The activator 22 is implemented by instructions from the CPU 101, and configured to activate the call controller 1060 (selected one of the videoconferencing application 1031 and the reception application 1032) in response to an activation request from the operation input receiver 12 when the operation input receiver 12 of the apparatus controller 1050 has received one of the applications (the videoconferencing application 1031 and the reception application 1032) selected by the user.

The creator 23 is implemented by instructions from the CPU 101, and configured to create an image of a destination list by including the above-described operating status icons within a later-described destination list frame.

The display controller 24 is implemented by instructions from the CPU 101 and the display I/F 117, and is configured to control transmission of screen data to the display 120.

The function executor 25 is implemented by instructions from the CPU 101, the camera 112, the microphone 114, the speaker 115 or the like, and is configured to control telephone call implementation through images, sound and the like.

The storage-reader 29 is implemented by instructions from the CPU 101 and the SSD 105, and is configured to store various types of data in the storage 1000 or read various types of data from the storage 1000.

Functional Configuration of Management System

The management system 50 includes a transmitter-receiver 51, an authenticator 52, a manager 53, a session controller 58, and a storage-reader 59. The above-described components are functions implemented by causing any one of the components illustrated in FIG. 4 to execute instructions from the CPU 201 in accordance with the management system programs loaded from the HD 204 in the RAM 203. The management system 50 includes a storage 5000 composed of the HD 204. The storage 5000 stores application icon data for each of the application IDs. The storage 5000 further includes respective DBs composed of later-described tables.

Authentication Management Table

FIG. 8A is a conceptual diagram illustrating an authentication management table. The storage 5000 includes an authentication management DB 5001 composed of an authentication management table illustrated in FIG. 8A. The authentication management table is configured to manage communications IDs of all the terminals 10 managed by the management system 50 in association with respective authentication passwords. Note that the communications ID is information for specifying a communications destination in the communications system 1. Examples of the communications ID may include, but not limited to, identifier information of the terminal 10, a user account of the terminal 10, and group identifier information of a group formed of multiple terminals 10. The following description is based on the assumption in which the communications ID is one of the identifier information of the terminal 10 and group identifier information of the group of the terminals 10.

Terminal Management Table

FIG. 8B is a conceptual diagram illustrating a terminal management table. The storage 5000 stores a terminal management DB 5002 composed of the terminal management table illustrated in FIG. 8B. The terminal management table is configured to manage destination names (terminal names) of the terminals 10 serving as destinations, operating statuses of the respective terminals 10, communications statuses indicating statuses of communications between the terminals 10 and counterpart terminals 10, and IP addresses of the terminals 10 in association with respective communications IDs of the terminals 10.

Application Availability Management Table

FIG. 8C is a conceptual diagram illustrating an application availability management table. The storage 5000 stores an application availability management DB 5003 composed of the terminal management table illustrated in FIG. 8C. The terminal management table is configured to manage availability information indicating whether each of the applications is available (On) or unavailable (Off) in association with the communications IDs of the terminals 10 and application IDs for identifying respective applications installed in the terminals 10.

Destination List Management Table

FIG. 8D is a conceptual diagram illustrating a destination list management table. The storage 5000 includes a destination list management DB 5004 composed of a destination list management table illustrated in FIG. 8D. The destination list management table is configured to manage all the communications IDs of the destination terminals registered as addressable destination terminal candidates in association with the communications ID of the request source terminal that has transmitted a communications start request for starting the communications.

Session Management Table

FIG. 8E is a conceptual diagram illustrating a session management table. The storage 5000 includes a session management DB 5005 composed of the session management table illustrated in FIG. 8E. The session management table is configured to manage relay apparatus IDs of the relay apparatuses 30 that relay content data between the terminals 10 in respective sessions, and the communications IDs of the terminals (attending terminals) 10 that attend the sessions in association with respective session IDs for identifying the sessions via which content data are transmitted between the terminals 10.

Status Change Quality Management Table

FIGS. 9A and 9B are conceptual diagrams illustrating status change management tables. The storage 5000 stores a status change management DB 5009 composed of the status change management tables illustrated in FIGS. 9A and 9B. The status change management table illustrated in FIG. 9A is configured to manage management information for use in controlling sessions between the terminals 10 in association with pre-change status information indicating communications statuses before execution of control based on the management information and post-change status information indicating communications statuses after execution of control based on the management information. The status change management table illustrated in FIG. 9B is configured to manage the management information in association with terminal information for identifying whether the terminal 10 is a request source terminal or a destination terminal, the pre-change status information, and the post-change status information.

Figure 10A:
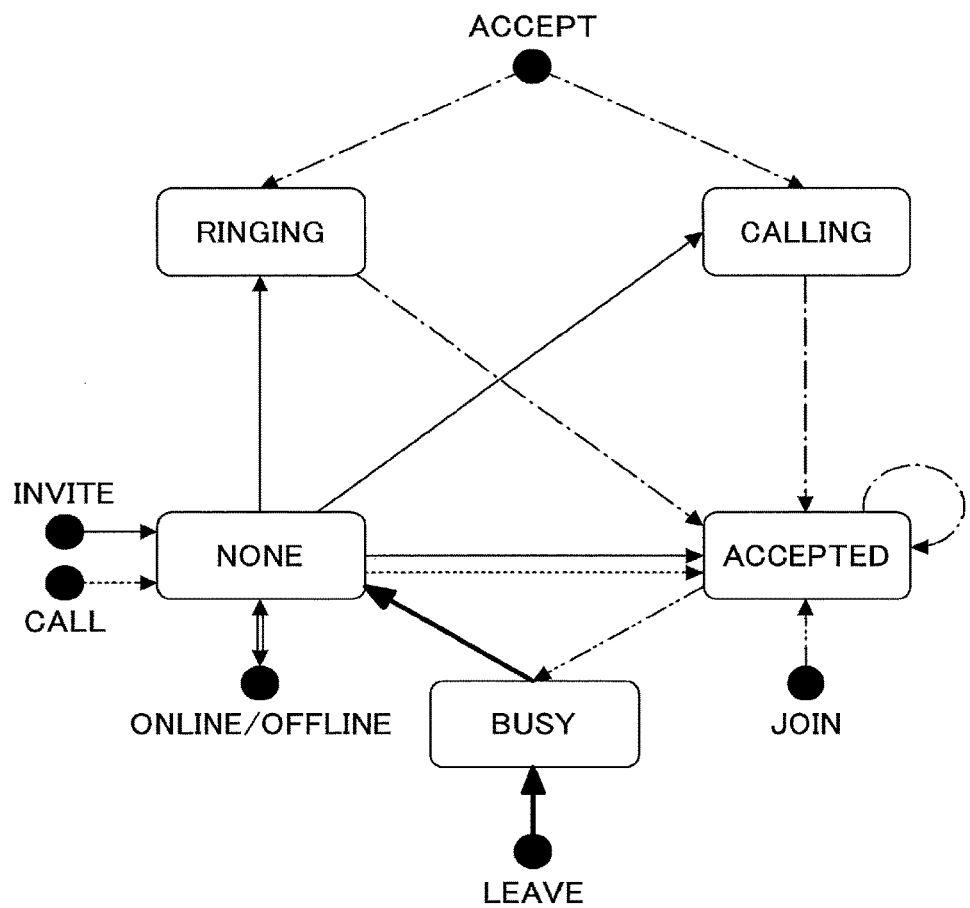
FIG. 10A is a status transition diagram illustrating communications status transitions implemented by status change rules.
Figure 10B:
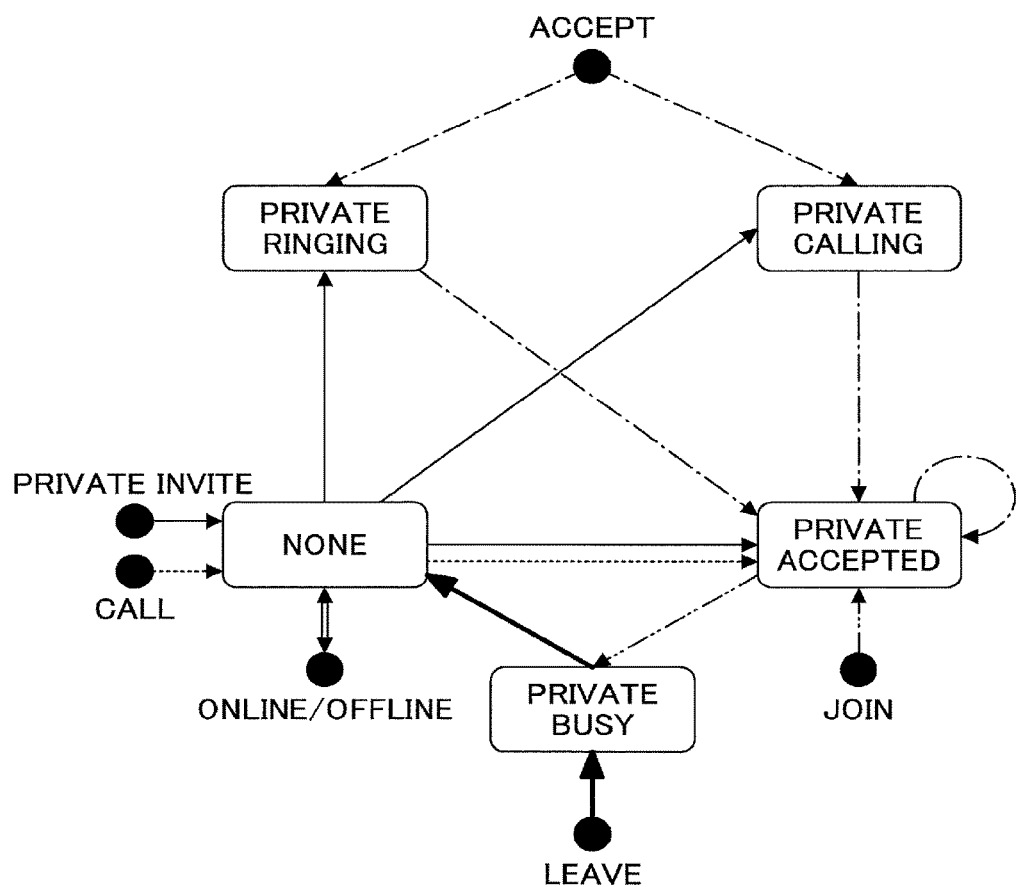
FIG. 10B is another status transition diagram illustrating communications status transitions implemented by status change rules.

FIGS. 10A and 10B are status transition diagrams illustrating communications status transitions implemented by status change rules recorded in the above-described status change management tables. As illustrated in FIGS. 10A and 10B, a later-described manager 53 may change the communications status of the request source terminal 10 from "None" to "Private Calling" based on the management information "Private Invite", and record the changed communications status in the terminal management table. Likewise, the manager 53 may change the communications status of the destination terminal from "None" to "Private Ringing" based on the management information "Private Invite".

Note that the management information "Invite" corresponds to a communications start request. The management information "Accept" corresponds to an acceptance response to the communications start request. The management information "Join" corresponds to a content data relay request. The management information "Call" corresponds to an attendance request for attending a session that has been established. The management information "Leave" corresponds to a session end request.

Group Information Management Table

FIG. 9C is a conceptual diagram illustrating a group information management table. The storage 5000 stores a group information management DB 5010 composed of the group information management table illustrated in FIG. 9C. The group information management table is configured to manage group communications IDs for identifying groups in association with destination names (group names) as group destinations and the communications IDs of the terminals (group-constituting terminal) 10 constituting the groups.

Group Status Management Table

FIG. 9D is a conceptual diagram illustrating a group status management table. The storage 5000 stores a group status management DB 5011 composed of the group status management table illustrated in FIG. 9D. The group status management table is configured to manage the communications IDs of the groups in association with respective group operating statuses of the groups.

Standby Information Management Table

FIG. 9E is a conceptual diagram illustrating a standby information management table. The storage 5000 stores a terminal management DB 5012 composed of the standby information management table illustrated in FIG. 9E. The standby information management table is configured to manage the group communications IDs for identifying the groups in association with a communications ID of a terminal (standby terminal) 10 that stands by communications with the group-constituting terminals 10 and received time at which the management system 50 has received a communications start request for starting communications with the group-constituting terminals 10.

Functional Configuration of Management System

The following describes a detailed functional configuration of the management system 50. Note that the following also illustrates a relationship between main components among the components illustrated in FIG. 4 and functions of the management system 50 for implementing the respective functions of the management system 50.

The transmitter-receiver 51 is implemented by instructions from the CPU 201 and the network I/F 209, and configured to perform transmission and reception of various types of data (or information) with communications counterpart terminals, apparatuses, or systems via the communications network 2.

The authenticator 52 is implemented by instructions from the CPU 201, and configured to search the authentication management table by the communications ID and password received by the transmitter-receiver 51, and determine whether the authentication management table includes the communications ID and password identical to the received communications ID and password to authenticate the terminal 10.

The manager 53 is implemented by instructions from the CPU 201, and configured to update the operating statuses, communications statuses, or the like in order to manage the latest operating statuses and communications statuses in the terminal management table (see FIG. 8B) or the group status management table (see FIG. 9D).

The session controller 58 is implemented by instructions from the CPU 201, and configured to control sessions via which content data are transmitted between the terminals 10 based on the instructions from the CPU 201. The control performed by the session controller 58 includes control session establishment, control attendance of the terminal 10 at the established session, control decoupling from the session, and the like.

The storage-reader 59 is implemented by instructions from the CPU 201 and the HDD 205, and is configured to store various types of data in the storage 5000 or extract various types of data from the storage 5000.

Processes and Operations of Communications System 1

Figure 11:
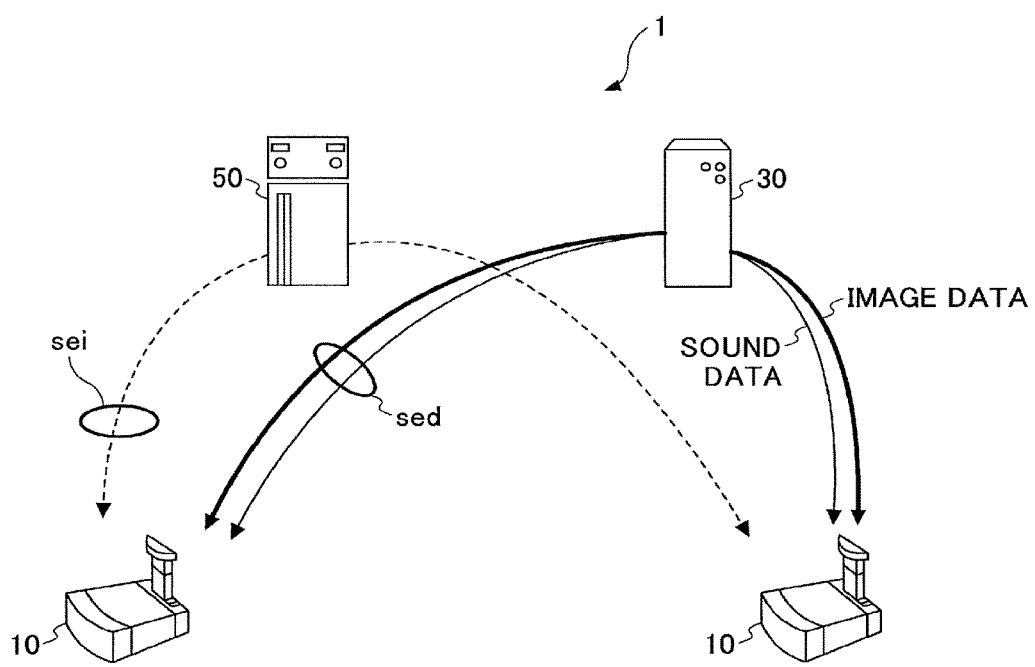
FIG. 11 is a conceptual diagram illustrating transmitting and receiving statuses of content data and various types of management information in the communications system.

The following illustrates processes and operations in the communications system 1. Initially, a description is given of an outline of the processes and operations in the communications system 1. FIG. 11 is a conceptual diagram illustrating statuses of transmitting and receiving content data and various types of management information in the communications system.

As illustrated in FIG. 11, a management information session sei for transmitting and receiving various types of management information is established between the terminals 10 via the management system 50 or between the terminals 10 and the management system 50 in the communications system 1. Further, sessions for transmitting and receiving content data (image data and sound data) are established between the terminals 10 via the relay apparatus 30. These sessions are integrated as a content data session sed in FIG. 11. That is, the content data session sed is configured to be used in videoconferencing.

Figure 12:
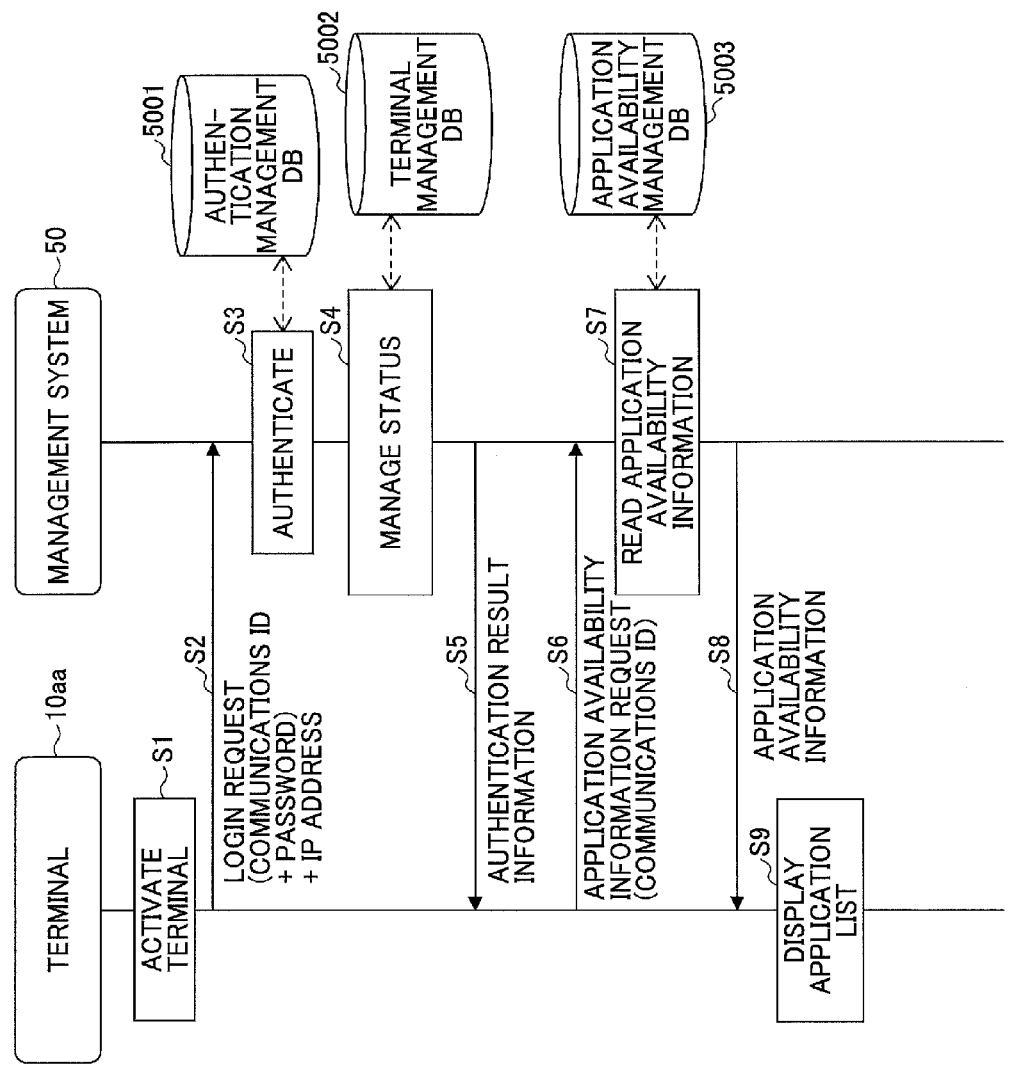
FIG. 12 is a sequence diagram illustrating an application list displaying process.

The following illustrates processes and operations in the communications system 1. A description is given of a process from activation of a terminal 10aa to display of an application list on the terminal 10aa with reference to FIG. 12. FIG. 12 is a sequence diagram illustrating a process from activation of the terminal 10 to display of the application list. Note that in FIG. 12, various types of management information are transmitted or received via the management information session sei.

When the user switches the power switch 109 ON, the operation input receiver 12 receives a power ON instruction to activate the terminal 10aa (step S1). The transmitter-receiver 11 transmits a login request to the management system 50 via communications network 2 in response to the reception of the power ON instruction as trigger (step S2). The transmitter-receiver 51 of the management system 50 receives the login request accordingly. This login request includes a communications ID and a password for identifying the terminal 10aa as a login request source terminal. The terminal ID and the password are data that are read from storage 1000 via the storage-reader 19 and transmitted to the transmitter-receiver 11. Note that the terminal ID and the password may be input by a user. Note that the management system 50 serving as a receiver may be able to acquire an IP address of the terminal 10aa serving as a transmitter when the login request is transmitted from the terminal 100aa to the management system 50.

The authenticator 52 of the management system 50 subsequently searches the authentication management table (see FIG. 8A) of the storage 5000 by the communications ID and the password included in the login request as a search key to determine whether the communications ID and the password managed in the authentication management table are identical to the communications ID and the password included in the login request, thereby authenticating the terminal 10aa (step S3). When the authenticator 52 authenticates the login request as a login request being transmitted from a terminal having a valid access right, the manager 53 stores the communications ID "01aa" of the terminal 10aa in association with the operating status "ONLINE (communications available)", the communications status "None", and the IP address of the terminal 10aa in the terminal management table (see FIG. 8B) (step S4).

The transmitter-receiver 51 of the management system 50 then transmits authentication result information indicating an authentication result obtained by the authenticator 52 to the terminal 10aa as a login request source that has transmitted the login request via the communications network 2 (step S25). The transmitter-receiver 11 of the terminal 10aa receives the authentication result information accordingly.

When the authenticator 52 authenticates the terminal 10aa as a terminal having a valid access right, the transmitter-receiver 51 of the terminal 10aa transmits an application availability information request indicating available applications installed in the terminal 10aa to the management system 50 via the communications network 2 (step S6). This application availability information request includes the communications ID of the terminal 10aa as an application availability information request source that has transmitted the application availability information request. The transmitter-receiver 51 of the management system 50 receives the application availability information request accordingly.

Next, the storage-reader 59 of the management system 50 searches the application availability table (see FIG. 8C) by the communications ID of the terminal 10aa as the application availability information request source as a search key and reads a corresponding one of the application availability information pieces (step S7). The application availability information in this case indicates the application ID "a001" being "On", and the application ID "a002" being "On", and the like.

The transmitter-receiver 11 subsequently transmits the application availability information read in step S7 to the terminal 10aa as the application availability information request source via the communications network 2 (step S8). The transmitter-receiver 11 of the terminal 10aa thus receives the application availability information.

Figure 13:
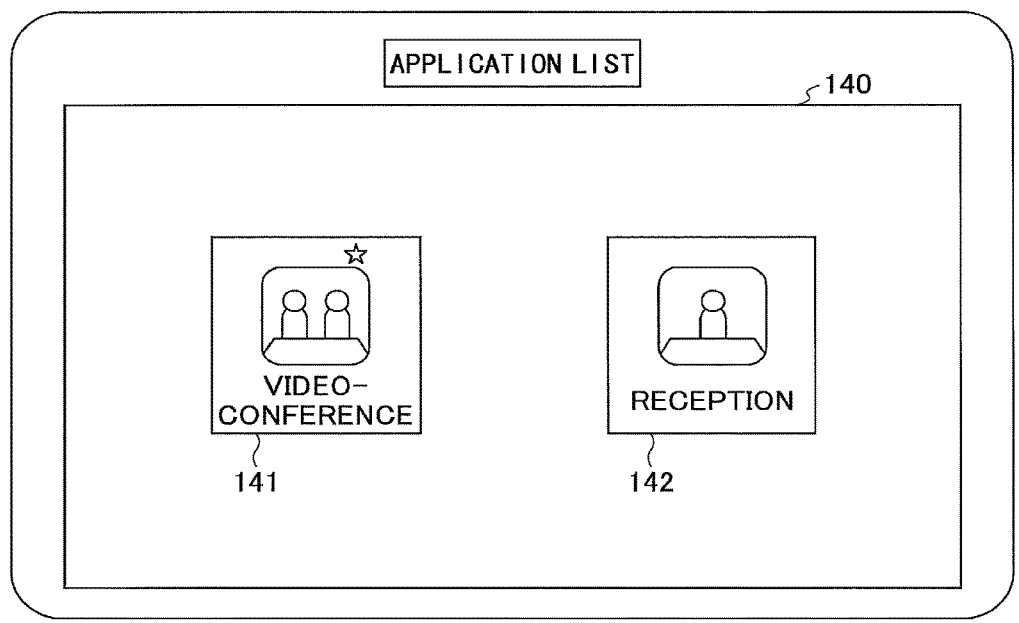
FIG. 13 is a diagram illustrating a screen example of an application list.

Next, the display controller 13 displays an application list screen 140 (a screen displaying a list of applications) illustrated in FIG. 13 on the display 120aa (step S9). Note that FIG. 13 is a diagram illustrating a screen example of the application list. The application list screen 140 displays application icons (141, 142, . . . ) in association with all the application IDs (a001, a002, . . . ) having the application availability information indicating available (On), for each of the application IDs (a001, a002, . . . ). The display controller 13 may display the application list screen 140 having check boxes for the user of the terminal 10aa to select necessary applications. The application IDs of the applications selected via the check boxes may be managed by any one of storages of the terminal 10aa and the management system 50. Since the user of the terminal 10aa may skip the step of selecting the application when the number of selected applications is one, the time required for stating the communications may be reduced.

Figure 14:
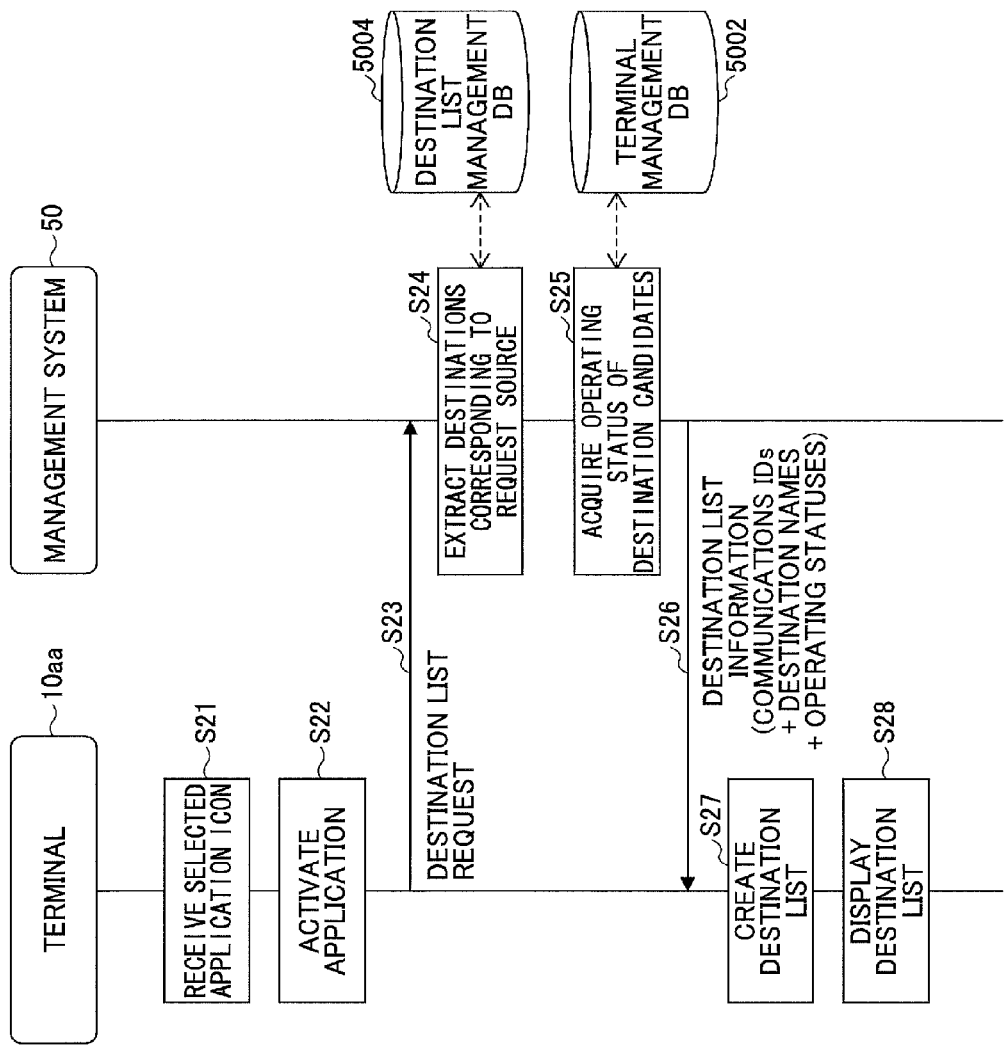
FIG. 14 is a sequence diagram illustrating a destination list displaying process.

Next, an illustration is given of a process from receiving the selection of an application icon by the terminal 10aa with reference to FIG. 14. Note that FIG. 14 is a sequence diagram illustrating a process from receiving the selection of the application icon to displaying the destination list by the terminal 10.

When the user operates operations buttons (108a to 108e) to select a desired one of the application icons illustrated in FIG. 13, the operation input receiver 12 of the terminal 10aa receives the application icon selected by the user (step S21). In the following description, it is assumed that the user has selected an application icon 141 representing the videoconferencing application 1031 in this case.

Subsequently, the operation input receiver 12 of the apparatus controller 1050 (in the terminal 10aa) transmits an activation request to the activator 22 implemented by the selected videoconferencing application 1031 to activate the call controller 1060 corresponding to the videoconferencing application 1031 (step S22). Note that the process before step S22 is a process performed by the apparatus controller 1050; however, a process subsequent to step S22 is performed by the call controller 1060 implemented by the activation of the videoconferencing application 1031.

The transmitter-receiver 21 of the call controller 1060 in the terminal 10aa transmits a destination list request for a destination list having a list of destination candidates of the terminal 10aa to the management system 50 via the communications network 2 (step S23). The transmitter-receiver 51 of the management system 50 receives the destination list request accordingly. This destination list request includes the communications ID of the terminal 10aa as a destination list request source that has transmitted the destination list request.

The storage-reader 59 of the management system 50 subsequently searches the destination list management table (see FIG. 8D) by the communications ID "01aa" of the terminal 10aa as the destination list request source as a search key and reads the communications IDs ("01ab", "01ad", . . . ) of the destination terminal candidates 10 that are able to have communications with the terminal 10 as the destination list request source (step S24).

The storage-reader 59 subsequently searches the terminal management table (see FIG. 8B) by the communications IDs ("01ab", "01ad", . . . ) of the destination candidate terminals 10 read in step S24 and reads corresponding destination names and operating statuses of the destination terminal candidates 10 (step S25).

The transmitter-receiver 51 transmits destination list information to the terminal 10 as the destination list request source via the communications network 2 (step S26). The transmitter-receiver 21 of the terminal 10 as the destination list request source receives the destination list information accordingly. The destination list information includes the communications IDs of the destination candidates read in step S24, and the destination names and the operating statuses read in step S25. The terminal 10aa as the destination list request source may be able to acquire current operating statuses of the destination terminal candidates 10 capable of having communications with the terminal 10aa.

Figure 15:
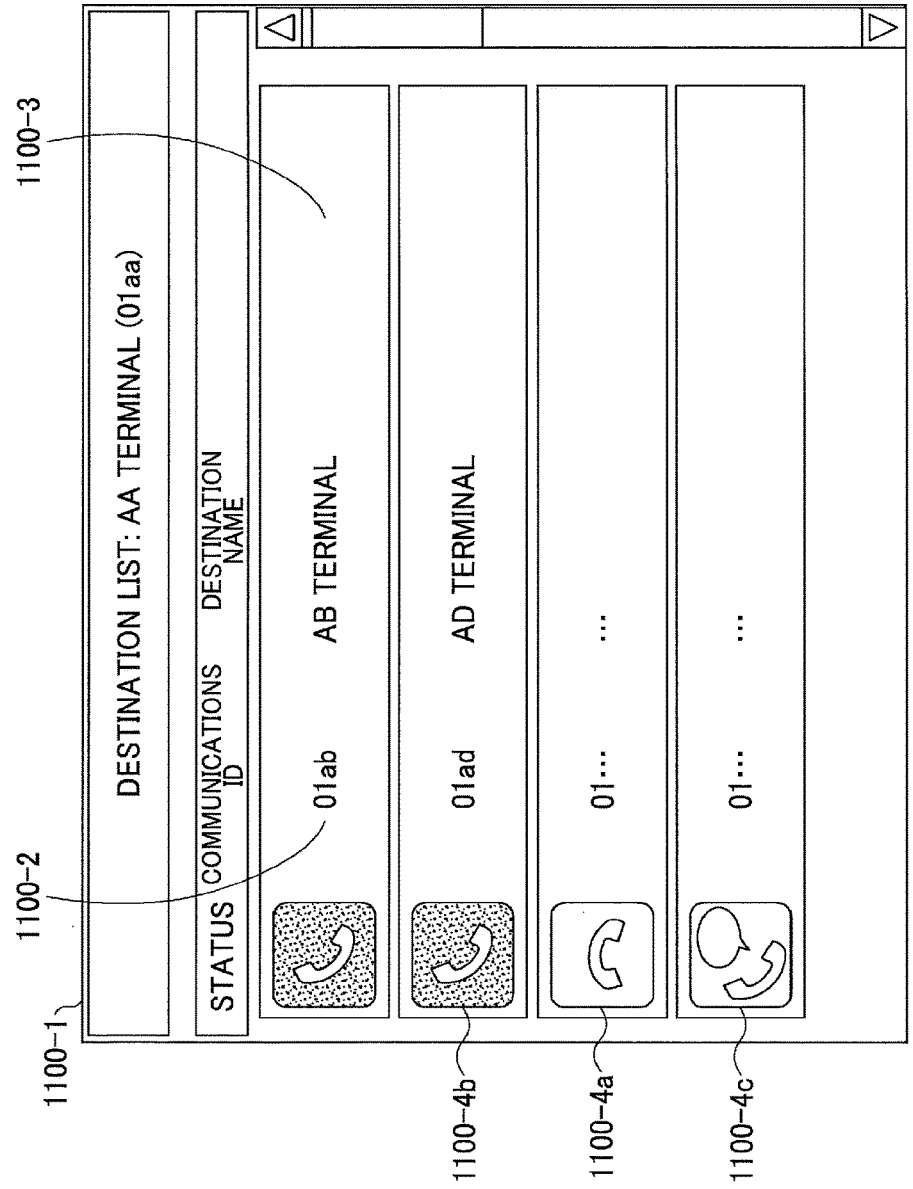
FIG. 15 is a diagram illustrating a display example of a destination list.

The creator 23 arranges the communications IDs and the destination names received in step S26 as well as arranging icons corresponding to the operating statuses received in step S26 to create image data of a destination list illustrated in FIG. 15 (step S27). Next, the display controller 24 displays a destination list P10 illustrated in FIG. 15 on the display 120aa (step S28). FIG. 15 is a diagram illustrating a display example of the destination list. The destination list illustrated in FIG. 15 includes communications IDs 1100-2 and destination names 1100-3 of the destination candidates, icons 1100-4a to 1100-4c reflecting the operating information, and the like in a destination list frame 1100-1. In this case, when the operating status is "OFFLINE", the creator 23 assigns an OFFLINE icon 1100-4a. When the operating status is "ONLINE (COMMUNICATIONS AVAILABLE)", the creator 23 assigns a COMMUNICATIONS AVAILABLE icon 1100-4b. When the operating status is "ONLINE (COMMUNICATIONS IN PROGRESS)", the creator 23 assigns a COMMUNICATIONS IN PROGRESS icon 1100-4c.

Figure 16:
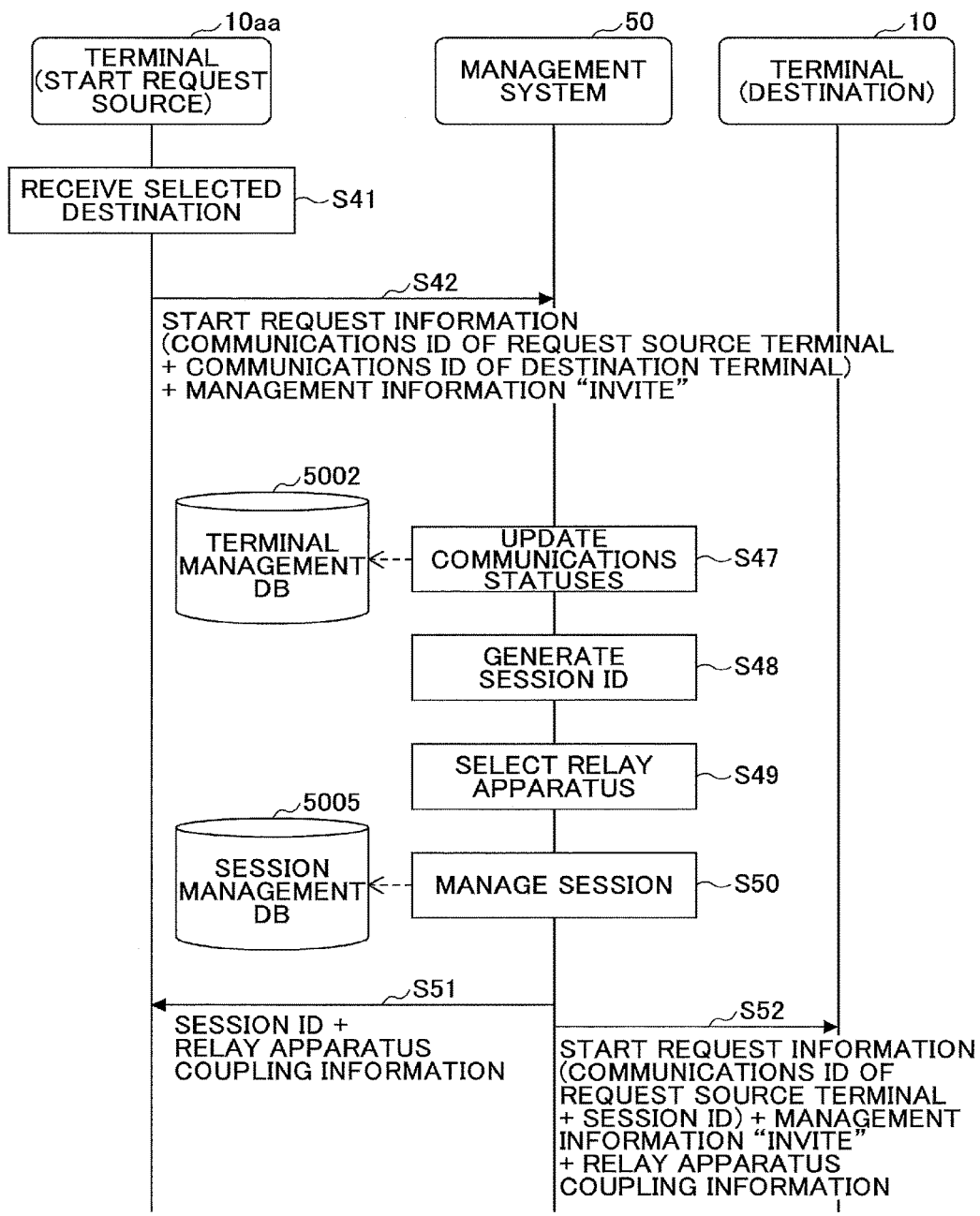
FIG. 16 is a sequence diagram illustrating a process of requesting starting communications.

Next, a description is given of a process in which the terminal 10aa requests starting communications with another terminal 10 with reference to FIG. 16. FIG. 16 is a sequence diagram illustrating a process of requesting starting communications. FIG. 16 illustrates a process of transmitting and receiving various types of management information via the management information session sei.

The user of the terminal 10aa may be able to request starting communications by selecting at least one of the destination candidates having the operating status being "ONLINE (COMMUNICATION AVAILABLE)" displayed in the destination list frame 1100-1. When the user of the terminal 10aa selects a desired destination candidate and presses the operations button 108, the function executor 25 receives the selected destination candidate (step S41). The transmitter-receiver 21 of the terminal 10aa transmits start request information including the communications ID "01aa" of the start request source terminal 10aa, the communications ID of the destination candidate, and management information "Invite" to the management system 50 (step S42). Note that the management information "Invite" indicates a communications start request without having limitations to attendance that is automatically selected by the process of the transmitter-receiver 21 based on the videoconferencing application 1031. The transmitter-receiver 51 of the management system 50 receives the start request information accordingly.

The manager 53 subsequently updates the communications status of the terminal 10aa as the start request source and the communications status of the destination terminal 10 (step S47). In this case, the manager 53 searches the status change management table (see FIG. 9B) by the management information "Invite" transmitted from the start request source terminal 10aa as a search key, and reads status information before change and status information after the change for each of the terminal information pieces. The manager 53 changes respective communications statuses of the terminals 10 based on the read terminal information, status information before the change and status information after the change. For example, the manager 53 changes the communications status of the start request source terminal 10aa from "None" indicated by the status information before the change to "Calling" indicated by the status information after the change. Similarly, the manager 53 changes the communications status of the destination terminal 10 from "None" indicated by the status information before the change to "Ringing" indicated by the status information after the change. The manager 53 changes, as part of step S47, the operating statuses associated with the respective communications IDs of the start request source terminal 10aa and the destination terminal 10 to the "ONLINE (COMMNICATIONS IN PROGRESS)" in the terminal management table.

The session controller 58 subsequently generates a session ID "se1" for identifying a session (content data session sed) to transmit content data between the start request source terminal 10aa and the selected destination terminal 10 (step S48).

Subsequently, the session controller 58 of the management system 50 selects the relay apparatus 30 for relaying the content data via the content data session sed between the start request terminal 10aa and the destination terminal 10 (step S49). In this embodiment, it is assumed that the relay apparatus 30a is selected by the session controller 58.

When the selection of the relay apparatus 30 has been completed, the storage-reader 59 manages the session ID generated in step S48 in association with the relay apparatus ID "111*a*" of the relay apparatus 30*a* selected in step S49, the communications ID "01*aa*" of the start request source terminal 10*aa* as the communications ID of an attending terminal attending the session, and the communications ID of the destination terminal 10 in the session management table (see FIG. 8E) (step S50).

Subsequently, the transmitter-receiver 51 transmits the session ID generated in step S48, and relay apparatus coupling information for use in coupling to the relay apparatus 30*a* selected in step S49 to the start request terminal 10*aa* via the communications network 2 (step S51). The relay apparatus coupling information may include an IP address "1.2.1.2" of the relay apparatus 30*a*, authentication information, a port number, and the like.

Subsequently, the transmitter-receiver 51 transmits the management information "Invite" indicating the communications start request without having limitations to attendance, the start request information including the session ID "se1" generated in step S48, and the relay apparatus coupling information for use in coupling to the relay apparatus 30*a* to the destination terminal 10 (step S52).

The above-described process may allow the start request source terminal 10*aa* and the destination terminal 10 to detect the relay apparatus coupling information for use in coupling to the relay apparatus 30*a* that relays the content data in the session having the session ID "se1".

The destination terminal 10 that has received the start request information transmits management information "Accept" representing approval of the start request to the management system 50. After receiving the approval of the start request, the request source terminal 10*aa* and the destination terminal 10 transmit management information "Join" for requesting coupling to the relay apparatus 30*a*. When the transmitter-receiver 51 of the management system 50 receives the management information "Join", the session controller 58 controls establishment of the content data session sed between the start request source terminal 10*aa* and the destination terminal 10.

The manager 53 of the management system 50 updates the communications statuses of the start request source terminal 10*aa* and the destination terminal 10 managed by the terminal management table (see FIG. 8B) based on the received management information every time the management system 50 receives the management information from the terminals 10. The process of managing the operating statuses and the communications statuses of the terminals 10 is similar to the process in step S47, and a duplicated description is thus omitted from the description. Note that the manager 53 updates the communications statuses in accordance with status transition rules illustrated in FIG. 10A to change the communications statuses of the start request source terminal 10*aa* and the terminal 10 to "Busy" in the terminal management table.

Figure 17:
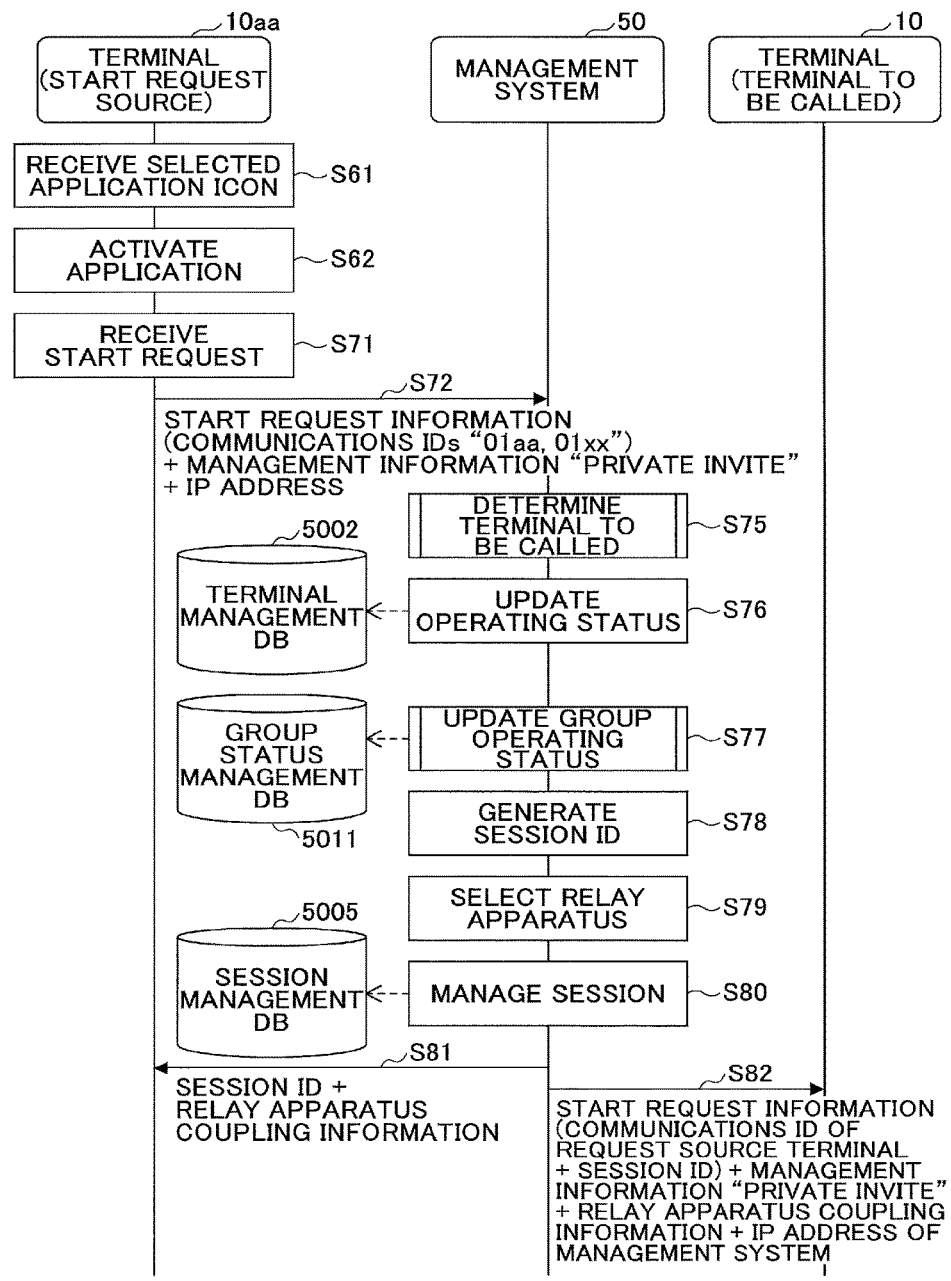
FIG. 17 is another sequence diagram illustrating the process of requesting starting communications.

In the above example, the applications icon 141 is selected in the terminal 10*aa*. The following illustrates, with reference to FIG. 17, an example in which the application icon 142 is selected. FIG. 17 is a sequence diagram illustrating a process of requesting starting communications.

When the user operates operations buttons (108*a* to 108*e*) to select a desired one of the application icons illustrated in FIG. 13 that indicates a reception application 1032, the operation input receiver 12 of the terminal 10*aa* receives the application icon 142 selected by the user (step S61).

Subsequently, the operation input receiver 12 of the apparatus controller 1050 transmits an activation request to an activator 22 implemented by the selected reception application 1032 to activate the call controller 1060 corresponding to the reception application 1032 (step S62). Note that the process before step S62 is a process performed by the apparatus controller 1050; however, a process subsequent to step S62 is performed by the call controller 1060 implemented by the activation of the reception application 1032.

Figure 18:
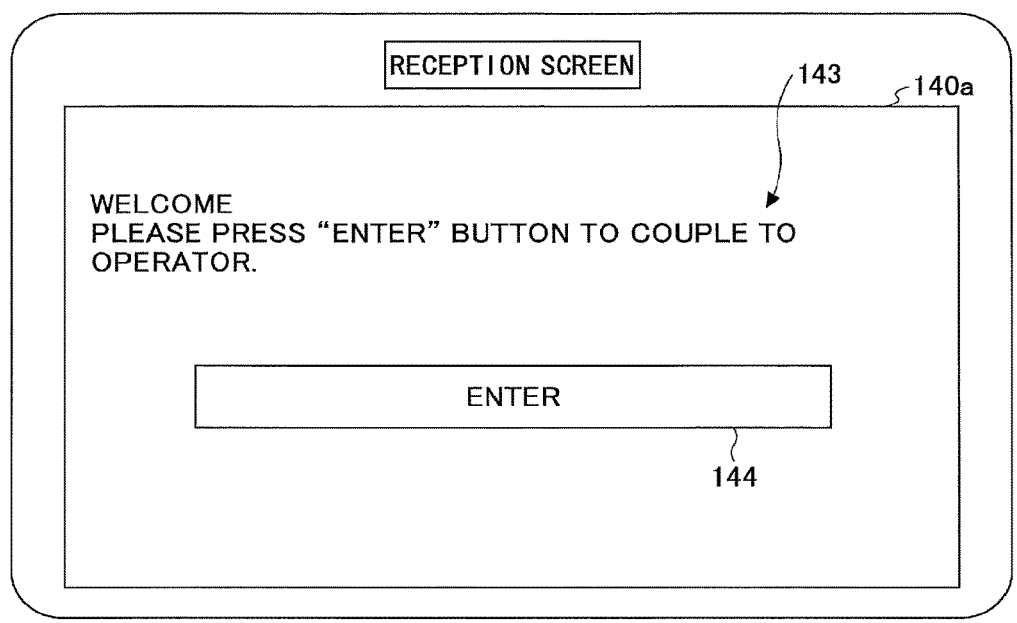
FIG. 18 is a diagram illustrating a reception screen.

The display controller 24 of the call controller 1060 subsequently displays a reception screen on the display 120*aa* for receiving the start of the communications with a call center. FIG. 18 is a diagram illustrating an example of the reception screen 140*a*. The reception screen 140*a* displays a message 143 that encourages the user of the terminal 10*aa* to start communications with the terminal 10 of the call center and a button 144 for receiving the start of the communications. The display controller 24 corresponding to each of the applications displays a message in accordance with an appropriate one of purposes or the user interfaces (see FIGS. 15 and 18). When selecting the reception application 1032, the user may skip the operation of selecting a destination because the display of the user interface for selecting destinations is omitted. The management system 50 may omit the process of transmitting the destination list information to the terminal 10.

When the user of the terminal 10*aa* subsequently presses a button 144 in the reception screen 140*a* of FIG. 18, the function executor 25 receives a communications start request (step S71). The transmitter-receiver 21 of the terminal 10*aa* transmits start request information including the communications ID "01*aa*" of the start request source terminal 10*aa*, the communications ID "01xx" of the destination candidate, and management information "Private Invite" together with the IP address of the start request source terminal 10*aa* to the management system 50 (step S72). Note that the communications ID "01xx" of the destination candidate serves as a group communications ID indicating the call center as the destination. The communications ID "01xx" of the destination candidate is automatically selected by the process of the transmitter-receiver 21 based on the reception application 1032. The management information "Private Invite" indicates a communications start request with limitations to attendance that is automatically selected by the process of the transmitter-receiver 21 based on the reception application 1032.

The session controller 58 of the management system 50 determines a calling terminal 10 (a terminal to be called) from the terminals 10 constituting a group identified by the group communications ID "01xx" (step S75).

Figure 19:
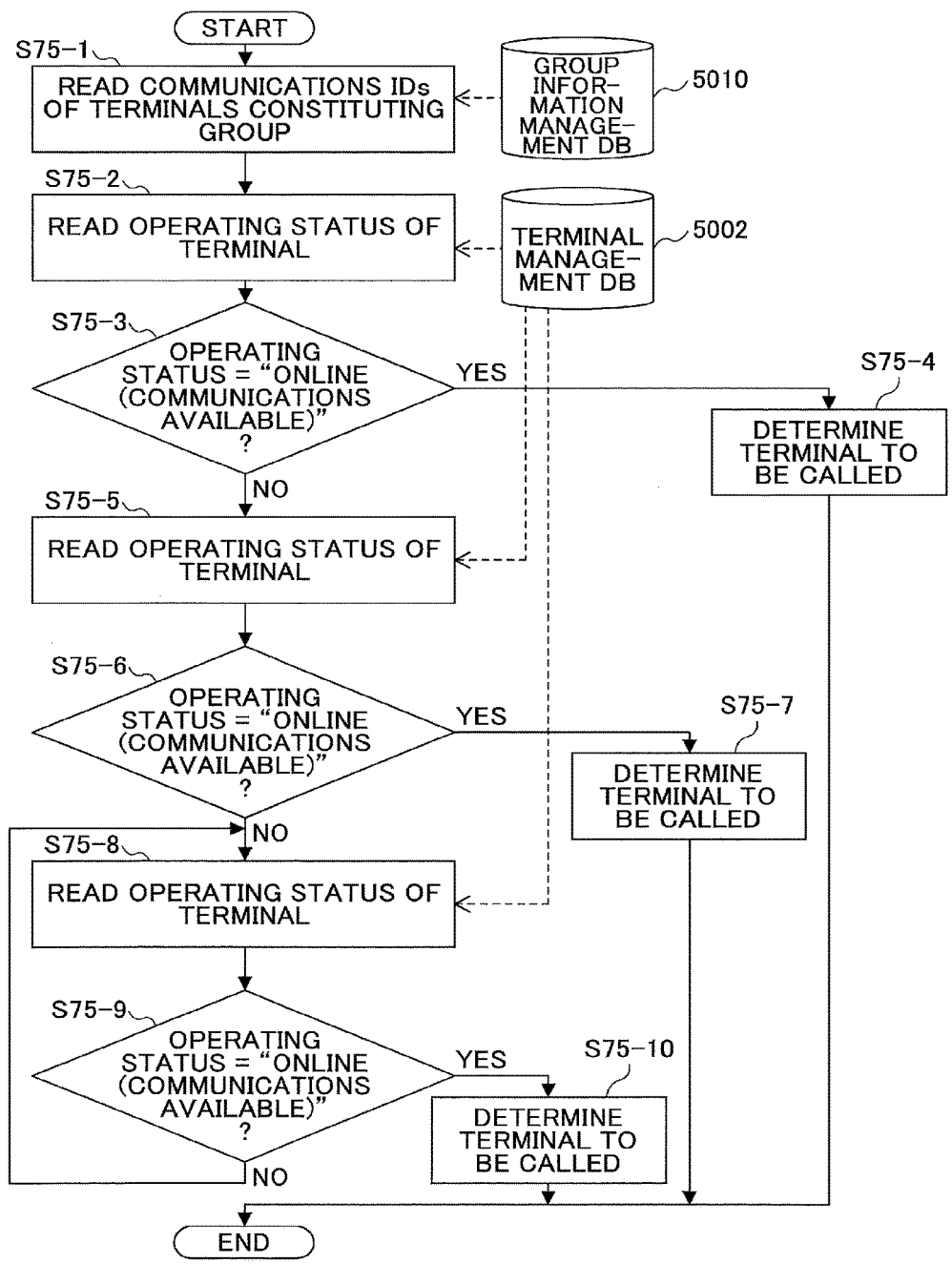
FIG. 19 is a flowchart illustrating a process of determining a terminal to be called.

The process of step S75 is illustrated with reference to FIG. 19. FIG. 19 is a flowchart illustrating a process of determining a terminal to be called. The storage-reader 59 searches the group information management table (see FIG. 9C) by the group communications ID "01xx" of the destination candidate included in the start request information as a search key to read the communications IDs included in the group (step S75-1). The following description is based on the assumption in which the communications IDs ("01*da*" and "01*db*") are read.

The manager 53 subsequently searches the terminal management table (see FIG. 8B) by any one (e.g., "01*da*") of the communications IDs ("01*da*" and "01*db*") read in step S75-1 as a search key to read the operating status of the corresponding terminal (step S75-2).

The session controller 58 subsequently determines whether the operating status read in step S75-2 is "ONLINE (COMMUNICATIONS AVAILABLE)" (step S75-3). When the session controller 58 determines that the operating status read in step S75-2 is "ONLINE (COMMUNICATIONS AVAILABLE)", the session controller 58 determines a terminal identified by the communications ID used as the search key in step S75-2 as a terminal (e.g., the terminal 10da) to be called (step S75-4).

When the session controller 58 determines that the operating status read in step S75-2 is not "ONLINE (COMMUNICATIONS AVAILABLE)" (step S75-3), the manager 53 searches the terminal management table (see FIG. 8B) by the second one (e.g., "01db") of the communications IDs ("01da" and "01db") read in step S75-1 as a search key to read the operating status of the corresponding terminal (step S75-5).

The session controller 58 subsequently determines whether the operating status read in step S75-5 is "ONLINE (COMMUNICATIONS AVAILABLE)" (step S75-6). When the session controller 58 determines that the operating status read in step S75-5 is "ONLINE (COMMUNICATIONS AVAILABLE)", the session controller 58 determines a terminal identified by the communications ID used as the search key in step S75-5 as a terminal (e.g., the terminal 10db) to be called (step S75-7). Note that when a group includes three or more terminals, the process of reading the operating status (see step S75-2 and step S75-5), and the process of determining the operating status (see step S75-3 and step S75-6) may be repeated in accordance with the number of terminals constituting the group.

When the session controller 58 determines that the operating status read in step S75-5 is not "ONLINE (COMMUNICATIONS AVAILABLE)" (step S75-6), the manager 53 searches the terminal management table (see FIG. 8B) by the communications IDs ("01da" and "01db") read in step S75-1 as search keys to periodically read the operating statuses of the corresponding terminals (step S75-8).

The session controller 58 determines whether the operating status read in step S75-8 is updated from "ONLINE (COMMUNICATIONS IN PROGRESS)" or "OFFLINE" to "ONLINE (COMMUNICATIONS AVAILABLE)" (step S75-9). When the session controller 58 determines that the operating status read in step S75-8 is updated from "ONLINE (COMMUNICATIONS IN PROGRESS)" or "OFFLINE" to "ONLINE (COMMUNICATIONS AVAILABLE)" (step S75-9), the session controller 58 selects the terminal having the updated operating status "ONLINE (COMMUNICATIONS AVAILABLE)" as a terminal to be called (step S75-10). Note that when the session controller 58 determines that the operating status read in step S75-8 is not updated from "ONLINE (COMMUNICATIONS IN PROGRESS)" or "OFFLINE" to "ONLINE (COMMUNICATIONS AVAILABLE)" (NO in step S75-9), the process in step S75-8 is repeated. Note that when any one of the communications IDs read in step S75-8 being "OFFLINE" is repeated predetermined times or is repeated for a predetermined time, the process of FIG. 17 may be terminated because no service from the call center may be provided.

The manager 53 subsequently changes the communications status "01aa" of the start request source terminal 10aa and the communications status corresponding to the communications ID of the terminal to be called as the destination (step S76). In this case, the manager 53 searches the status change management table (see FIG. 9B) by the management information "Private Invite" transmitted from the start request source terminal 10aa as a search key, and reads status information before change and status information after the change for each of the terminal information pieces. The manager 53 updates respective communications statuses of the terminals 10 based on the read terminal information, status information before the change and status information after the change (step S76). In this case, the manager 53 changes the communications status of the start request source terminal 10aa from "None" indicated by the status information before the change to "Private Calling" indicated by the status information after the change. Similarly, the manager 53 changes the communications status of the terminal to be called from "None" indicated by the status information before the change to "Private Ringing" indicated by the status information after the change. The manager 53 changes, as part of step S76, the operating statuses associated with the respective communications IDs of the start request source terminal 10aa and the terminal to be called to the "ONLINE (COMMNICATIONS IN PROGRESS)" in the terminal management table.

Figure 20:
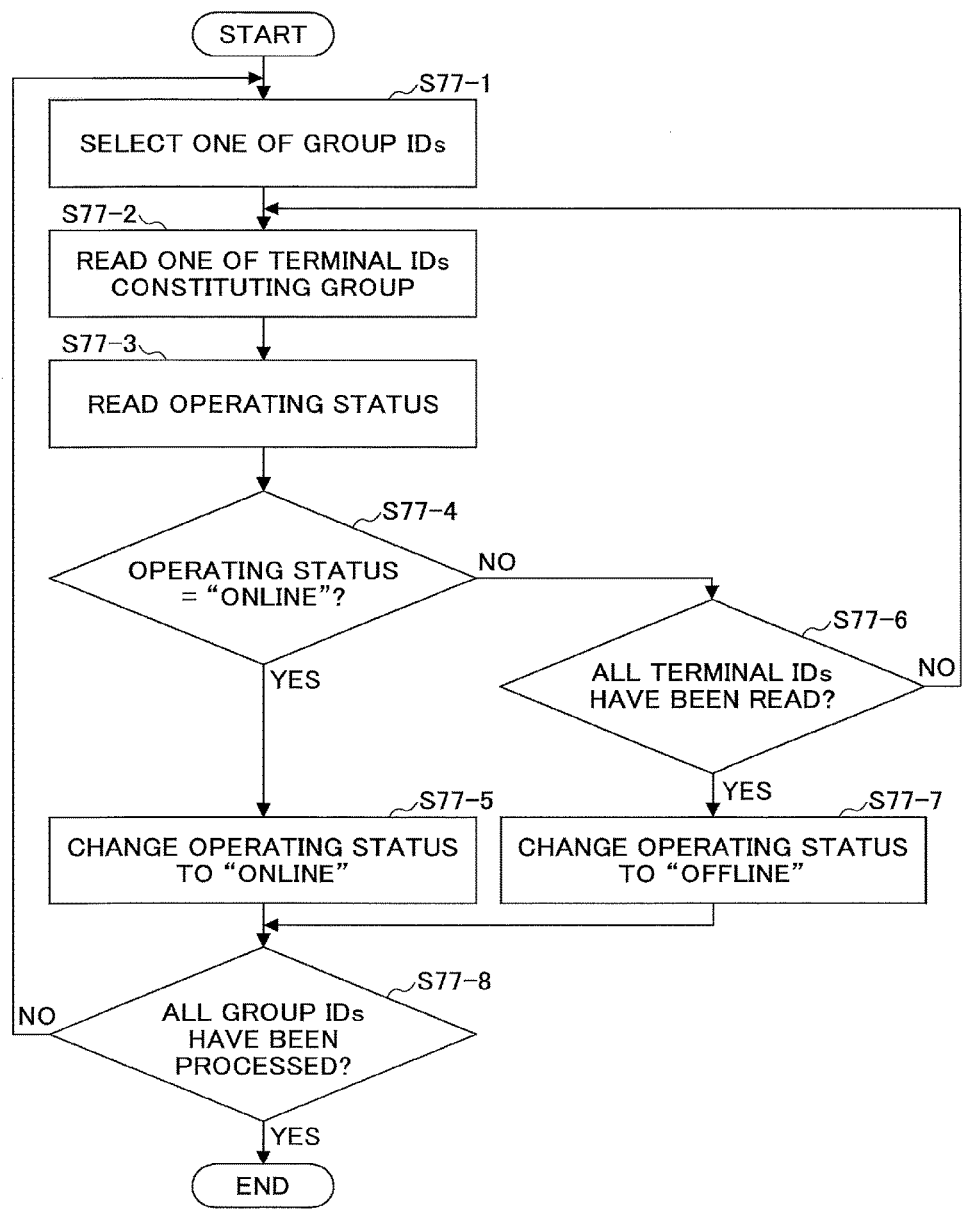
FIG. 20 is a flowchart illustrating a process of updating an operating status of a group.

The manager 53 subsequently updates an operating status of the group managed by the group status management table (see FIG. 9D) (step S77). The following illustrates a process of updating an operating status of a group with reference to FIG. 20. FIG. 20 is a flowchart illustrating a process of updating an operating status of a group. The process may be executed at any timing such as when the operating status of the terminal 10 constituting the group is changed. Note that the timing of updating the operating status of the group is not particularly specified; however, the operating status of the group may be updated at predetermined intervals.

The storage-reader 59 refers to the group information management table of FIG. 9C to select one of the group IDs (step S77-1). The storage-reader 59 subsequently reads one of the communications IDs constituting the group selected in step S77-1 (step S77-2). The manager 53 refers to the terminal management table (see FIG. 8B) to read an operating status corresponding to the communications ID read in step S77-2 (step S77-3).

The manager 53 determines whether the operating status read in step S77-2 is "ONLINE (COMMUNICATIONS AVAILABLE)" or "ONLINE (COMMNICATIONS IN PROGRESS)" (step S77-4). When the manager 53 determines that the operating status read in step S77-2 is "ONLINE (COMMUNICATIONS AVAILABLE)" or "ONLINE (COMMNICATIONS IN PROGRESS)", the manager 53 determines the operating status of the group ID selected in step S77-1 to be "ONLINE", and stores information about the operating status being "ONLINE" in the group status management table of FIG. 9D.

When the manager 53 determines that the operating status read in step S77-2 is not "ONLINE (COMMUNICATIONS AVAILABLE)" or "ONLINE (COMMNICATIONS IN PROGRESS)" in step S77-4, the manager 53 determines whether the communications IDs of all the terminals 10 included in the group selected in step S77-1 have been read (step S77-6). When the manager 53 determines that the communications IDs of all the terminals 10 included in the group selected in step S77-1 have been read in step S77-6, the manager 53 determines the operating status of the group ID selected in step S77-1 is "OFFLINE", and stores information about the operating status being "OFFLINE" in the group status management table of FIG. 9D (step S77-7). When the manager 53 determines that not all the communications IDs of the terminals 10 included in the group selected in step S77-1 have been read in step S77-6, the manager 53 executes a process in step S77-2.

When the manager 53 determines that all the group IDs managed in the group information management table have been selected and processed, the manager 53 ends the process of FIG. 20. When the manager 53 determines that not all the group IDs managed in the group information management table have been selected and processed yet, the manager 53 returns to step S77-1 to select a next group ID and execute the process.

The above-described process enables the management of the operating status of the group in a manner similar to the operating status of the terminal 10. Hence, each of the start request source terminals 10 does not need to determine whether the destination is the terminal 10 or the group.

The management system 50 subsequently controls establishment of a content data session between the terminal 10aa and the terminal to be called (terminal 10) (steps S78 to S82). The process with the control is similar to the process in steps S48 to S52, and a duplicated illustration is thus omitted from the description. Note that the manager 53 updates the communications statuses in accordance with status transition rules illustrated in FIG. 10B to change the communications statuses of the start request source terminal 10aa and the terminal 10 to "Private Busy" in the terminal management table.

Note that during the videoconferencing, the terminal 10 attending the videoconferencing, that is, the terminal 10 attending the established session may display on the display 120 whether the videoconferencing uses a session with attendance limitation or a session without the attendance limitation so as to allow the attendees of the videoconferencing to recognize whether there is attendance limitation to the videoconferencing.

Figure 21:
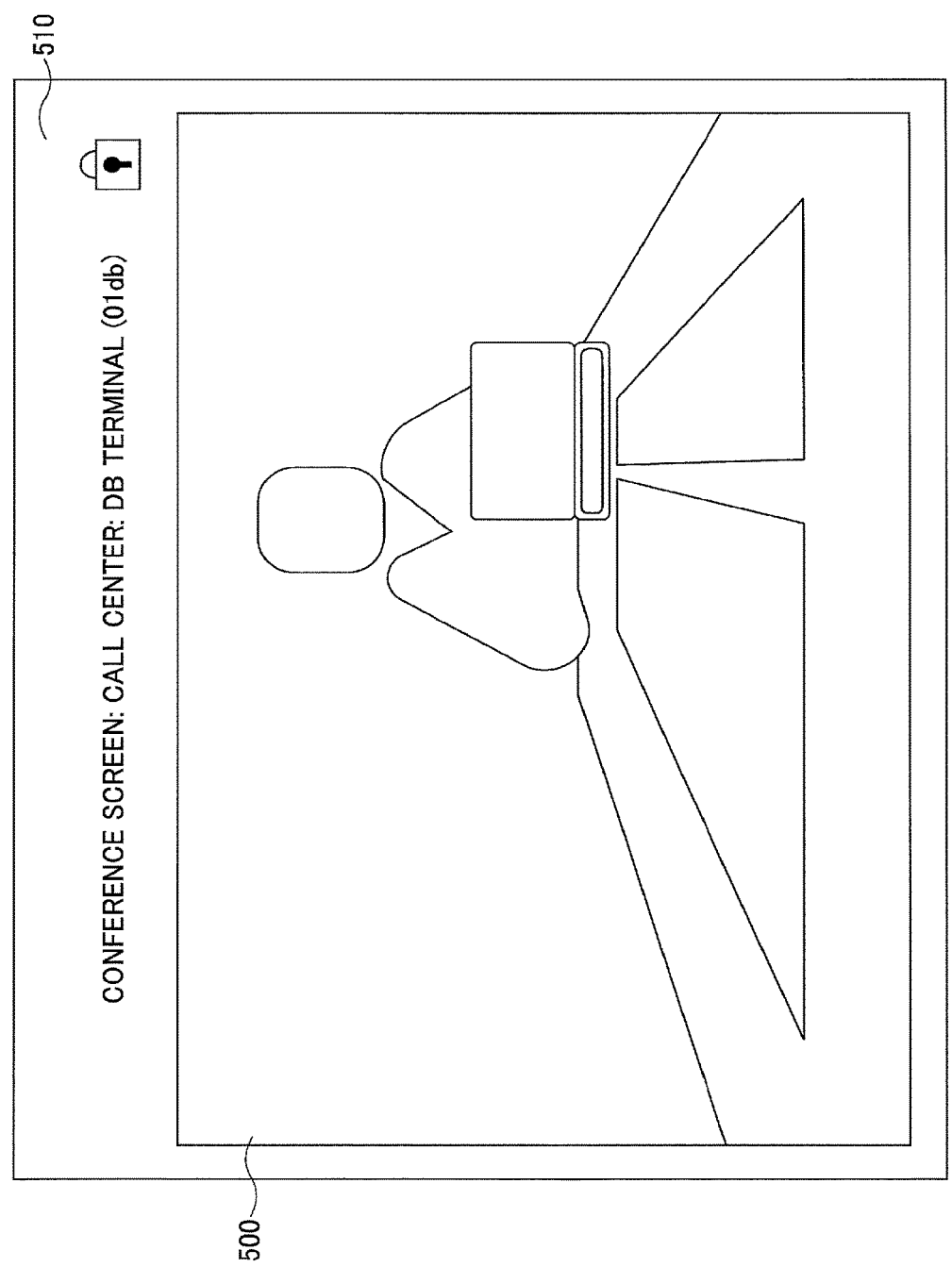
FIG. 21 is a diagram illustrating an example of a screen to be displayed during a conference.

Note that a description is given of a display example by the terminal 10 in association with the videoconferencing with or without attendance limitation with reference to FIG. 21. FIG. 21 illustrates an example of a screen displayed on the display 120 while the terminal 10 attends the videoconferencing with another terminal. The display controller 13 of the terminal 10 outputs an auxiliary area 510 for displaying detailed information in association with the videoconferencing in addition to a video 500 imaged by a counterpart terminal 10.

The display controller 13 of the terminal 10 may output information representing whether the videoconferencing that the terminal 10 currently attends has attendance limitation based on the management information transmitted from the management system 50 at a desired location within the auxiliary area 510. For example, when the user starts the videoconferencing with attendance limitation and a session relating to the videoconferencing with attendance limitation has been established, the display controller 13 of the terminal 10 may display a lock-shaped icon in the auxiliary area 510. Accordingly, the user of the terminal 10 may be able to check whether the videoconferencing that the terminal 10 itself attends has the attendance limitation based on the presence or absence of the display of the icon.

Figure 22:
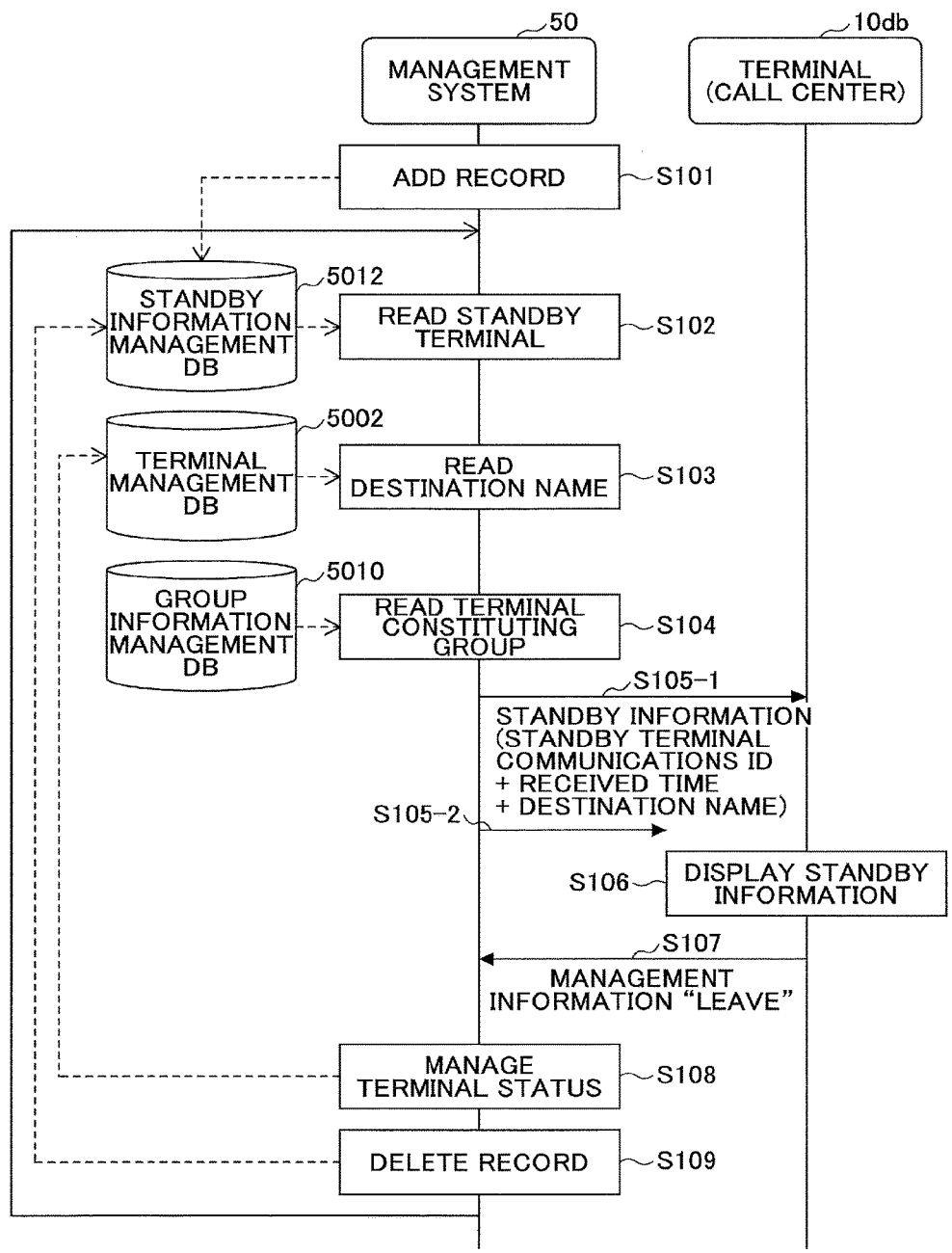
FIG. 22 is a flowchart illustrating a process of reporting a standby status.

Next, a description is given, with reference to FIG. 22, of a case where communications are unable to start due to all the terminals 10 in the call center being currently engaged in communications when the terminal 10aa requests starting the communications with the call center using the reception application 1032. FIG. 22 is a flowchart illustrating a process of reporting a standby status.

When all the terminals 10 in the call center are currently engaged in communications, that is, when the session controller 58 determines that the operating status read in step S75-5 is not "ONLINE (COMMUNICATIONS AVAILABLE)" (No in step S75-6), the storage-reader 59 of the management system 50 adds a record in association with the group communications ID "01xx" of the group, the communications ID "01aa" of the start request source terminal 10aa, and received time at which the management system 50 has received the start request in the standby information management table (see FIG. 9E) (step S101).

After the record is added, the storage-reader 59 reads the communications ID and the received time of each of the standby terminals in association with the group ID "01xx" of the destination in the standby information management table (see FIG. 9E) (step S102). The storage-reader 59 searches the terminal management table (see FIG. 8B) by the communications IDs of the standby terminals read in step S102 as search keys to read the corresponding destination names (terminal names) (step S103). In addition, the storage-reader 59 searches the group information management table (see FIG. 9C) by the group communications ID "01xx" of the destination as a search key to read the communications IDs of the terminals included in the group (step S104).

Figure 23:
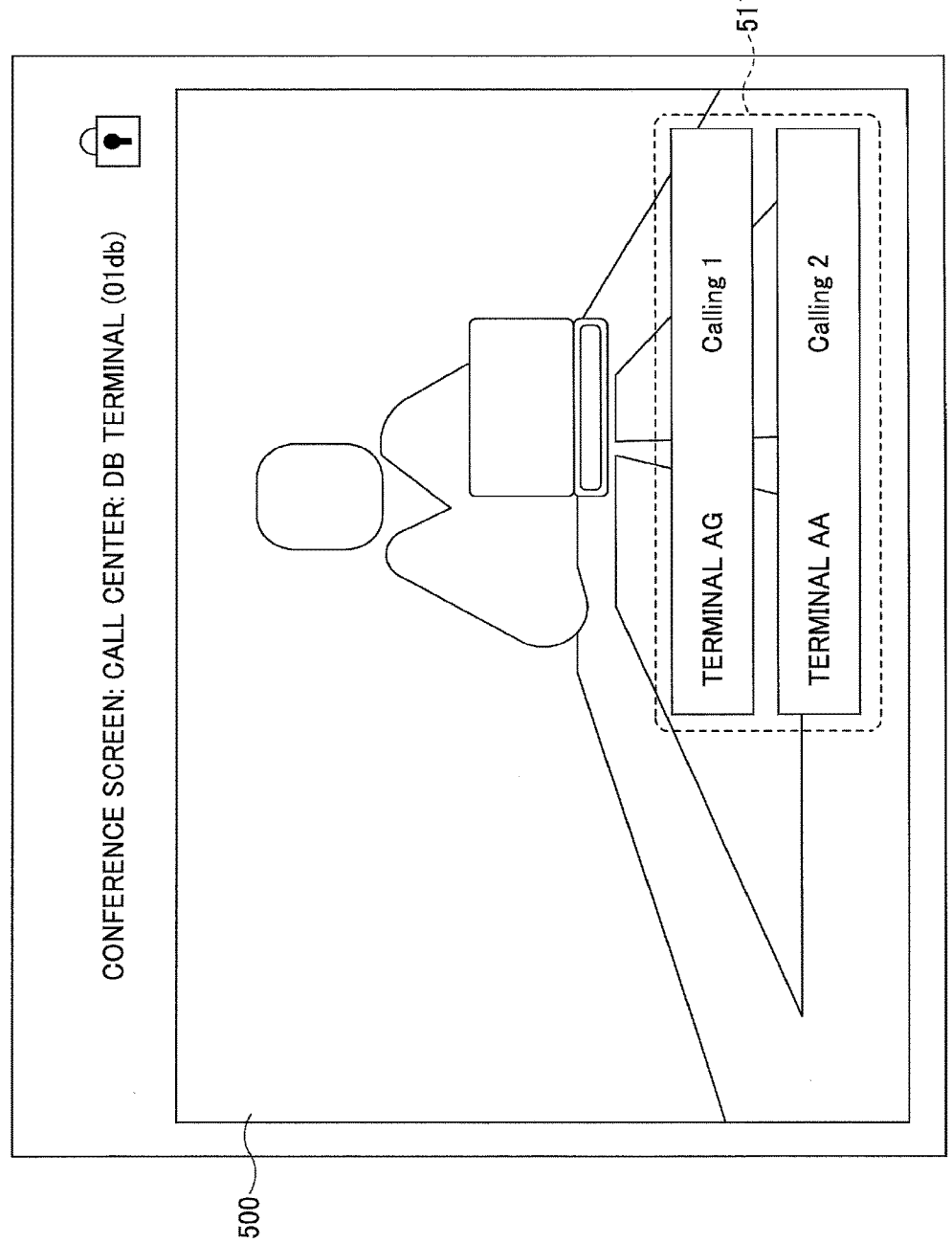
FIG. 23 is a diagram illustrating a display example of a display.

The transmitter-receiver 51 subsequently transmits to the terminals corresponding to the communications IDs read in step S104 the communications IDs of the standby terminals, the received time at which the management system 50 has received the start request, and standby information including destination names of the standby terminals read in step S103, for each of the standby terminals read in step S102 (steps S105-1, S105-2, . . . ). When the transmitter-receiver 11 of the terminal 10 at the call center receives the standby information, the display controller 24 displays the destination names of the standby terminals included in the standby information on the conference screen of the display 120 in the order of received time (step S106). Note that FIG. 23 is a diagram illustrating a display example of the screen of the display 120db in step S106. The display controller 24 of the terminal 10 at the call center displays, in addition to the video 500 imaged by the terminal 10 of the current communications counterpart, a message 511 representing a standby terminal based on the standby information. The terminal 10 at the call center may be able to detect standby statuses.

Next, when the terminal 10db at the call center ends the communications, the transmitter-receiver 21 of the terminal 10db transmits management information "Leave" indicating the end of the communications to the management system 50 (step S107). In the management system 50 that has received the management information "Leave", the session controller 58 executes ending control on the content data session sed between the terminal 10db and the terminal 10 of the current communications counterpart. The manager 53 updates the operating status of the terminal 10db from "ONLINE (COMMNICATIONS IN PROGRESS)" to "ONLINE (COMMUNICATIONS AVAILABLE)", and the communications status of the terminal 10db from "Private Busy" to "None" (see FIG. 10B) (step S108). The terminal 10db may become a new terminal to be called with respect to the standby terminal in accordance with an update status of the operating status (see step S75-10). When the terminal to be called is determined, the session controller 58 of the management system 50 controls establishment of a content data session between the standby terminal 10 and the terminal db to be called (see steps S78 to S82).

When the content data session between the standby terminal 10 and the terminal db to be called is established, the storage-reader 59 deletes a record including the communications ID of the standby terminal 10 that has started the communications with the terminal db to be called from the standby information management table (see FIG. 9E) (step S109). After the process of step S109 has completed, the management system 50 repeats steps subsequent to step S102. The management system 50 may thus be able to report the updated standby information to the terminal at the call center.

Figure 24:
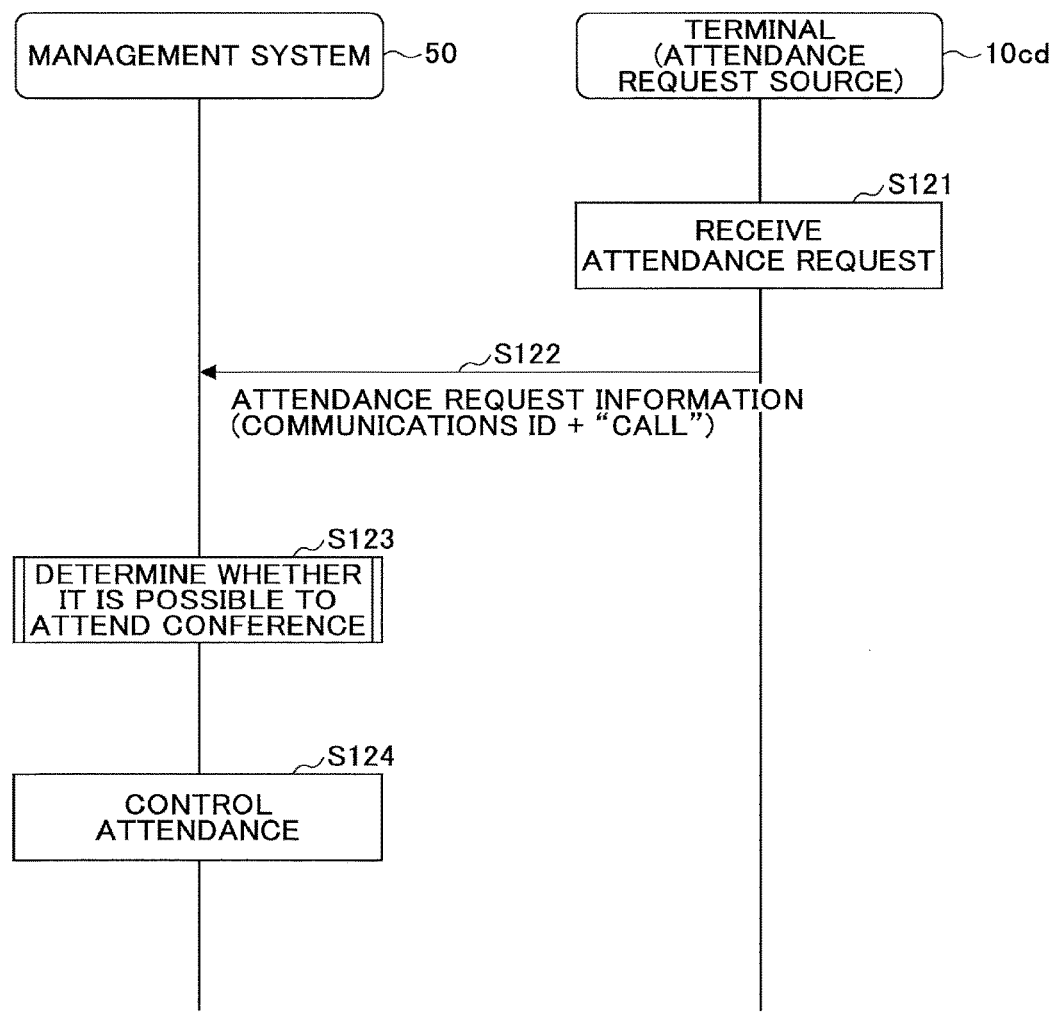
FIG. 24 is a sequence diagram illustrating a process of attending a content data session.

Next, a description is given, with reference to FIG. 24, of a process of a case in which after the establishment of the content data session sed between the start request source terminal 10aa and the destination terminal 10db, a terminal 10cd requests to attend the content data session sed. FIG. 24 is a sequence diagram illustrating a process of joining a content data session sed. FIG. 24 illustrates a process of transmitting and receiving various types of management information via the management information session sei.

The destination list is displayed on the display 120cd of the terminal 10cd by the process illustrated with reference to FIG. 14. The user of the attendance request source terminal 10cd operates the operations button 108 to select a terminal (a terminal 10aa in this case) having the operating status "ONLINE (COMMUNICATIONS IN PROGRESS)". In response to the selection, the operation input receiver 12 receives the attendance request for attending the already established content data session (step S121).

The transmitter-receiver 11 of the terminal 10cd transmits attendance request information including the communications ID "01cd" of the own terminal 10cd, the communications ID "01aa" of the selected terminal 10aa, and the management information "Call" indicating a request for attending the content data session to the management system 50 (step S122).

Figure 25:
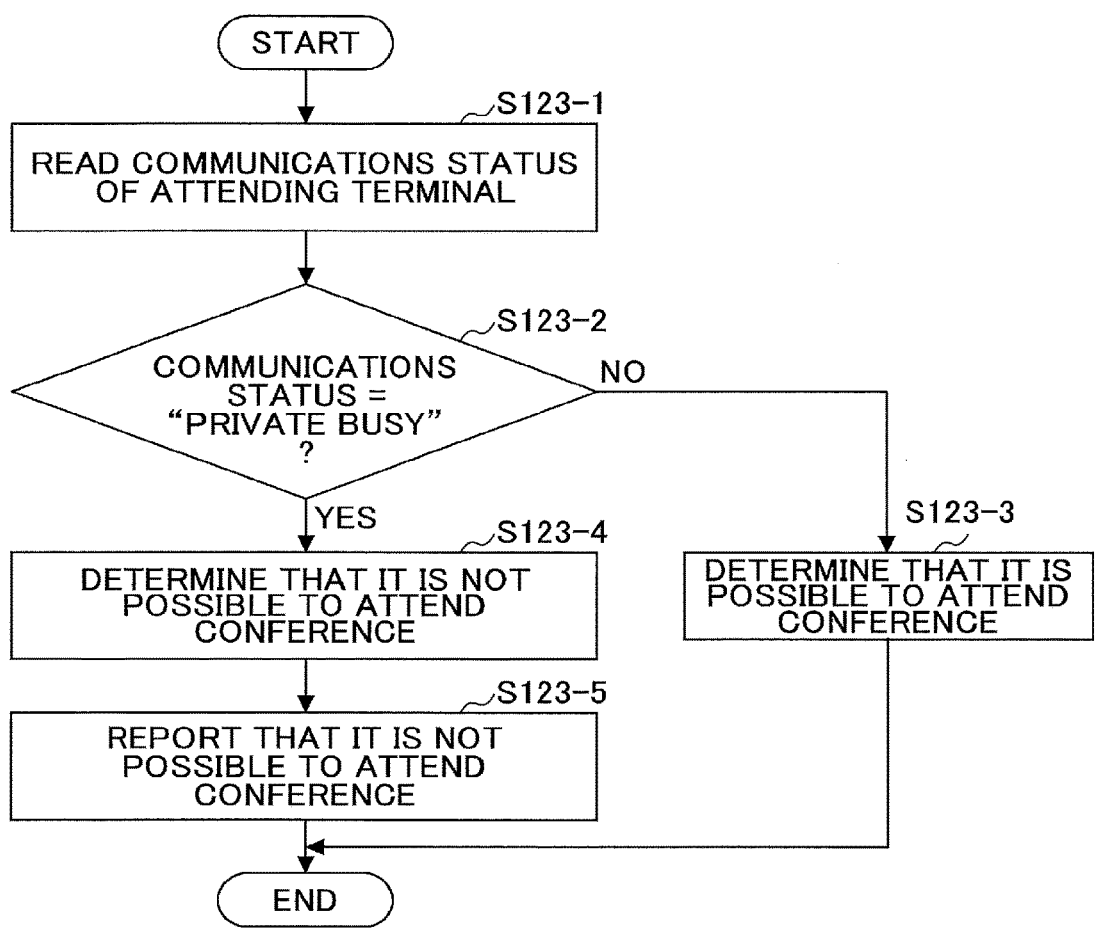
FIG. 25 is a flowchart illustrating a process of determining attendance based on a communications status.

The management system 50 that has received the attendance request information determines whether to continue a process of coupling the attendance request source terminal 10cd and the terminals (10aa and 10db) currently attending the content data session sed (step S123). The process of step S123 is illustrated in more detail with reference to FIG. 25. FIG. 25 is a flowchart illustrating a determination process of determining the attendance based on a communications status.

The storage-reader 59 searches the terminal management table (see FIG. B) by the communications ID "01aa" of the terminal 10aa currently attending the session as a search key to read the communications status of the corresponding terminal (step S123-1). The session controller 58 subsequently determines whether the read communications status is "Private Busy" (step S123-2). When the read communications status is not "Private Busy", the session controller 58 determines that it is possible for the attendance request source terminal 10cd to attend the session, and ends the process (step S123-3).

On the other hand, when the read communications status is "Private Busy", the session controller 58 determines that it is not possible for the attendance request source terminal 10cd to attend the session (step S123-4). The transmitter-receiver 11 subsequently transmits a report informing that it is not possible to attend the session to the attendance request source terminal 10cd (step S123-5). Note that the attendance request source terminal 10cd that has received a report informing that it is not possible to attend the session displays the report on the display 120.

When the session controller 58 determines that it is possible for the attendance request source terminal 10 to attend the session, the management system 50 controls causing the terminal 10cd to attend the content data transmission session between the terminals (10aa and 10cd) (step S124). An example of this process includes transmitting relay apparatus coupling information for coupling the terminal 10cd to the relay apparatus 30a to which the terminals (10aa and 10cd) are coupled. An example of the control method for allowing a terminal to attend a session includes, but is not limited to, the method illustrated in Japanese Unexamined Patent Application Publication No. 2012-50063.

According to the embodiment, when the reception application 1032 is selected, the content data session sed with attendance limitation is established. This is because the destination group is the call center (see FIG. 9C) and it is not assumed for the third party to attend the established session.

Supplementary Explanation

The management system 50 and the program providing system 90 in the embodiments described above may be constructed by a single computer, or may be constructed by multiple computers to which components (functions and units) of the management system 50 and the program providing system 90 are separately assigned. In addition, when the program providing system 90 is constructed by a single computer, the programs transmitted by the program providing system 90 may be divided into multiple modules, or the programs may be transmitted without being divided into multiple modules. Further, when the program providing system 90 is constructed by multiple computers, the programs may be divided into multiple modules and the multiple modules of the programs are separately assigned to the computers, such that the multiple modules of the programs may be transmitted from the respective computers.

Any of the recording medium storing the terminal program, the relay apparatus program and the communications management program of the communications system 1, the HD 204 storing the above-described programs, and the program providing system 90 provided with the HD 204 are used for providing the terminal program, the relay apparatus program and the communications management program to users domestically or internationally as program products.

Further, the above-described communications system 1 may manage, but not limited to, the IP addresses of the terminals in the terminal management table illustrated in FIG. 8B. The communications system 1 may manage fully qualified domain names (FQDN) of the terminals in a case where terminal identification information for identifying the terminals 10 over the communications network 2 is used. In this case, the IP address corresponding to FQDN is acquired by a known domain name system (DNS) server.

In the communications system 1, the "teleconferencing" and "video conferencing" are interchangeably used.

Further, the communications system 1 in the above embodiment illustrates the videoconferencing system; however, the communications system 1 is not limited to the videoconferencing system. The communications system 1 may be a car navigation system. In this case, one of the terminals 10 corresponds to a car navigation apparatus installed on a vehicle, and the other one of the terminals 10 corresponds to a management system or a management terminal in a management center that manages navigation of the car, or another car navigation apparatus installed on another vehicle.

In addition, the communications system 1 may be an audio conferencing system, or a personal computer (PC) screen sharing system. The communications system 1 may be a communications system of the Internet protocol (IP) phone, the internet phone, or a mobile phone. In this case, the terminal 10 corresponds to the mobile phone apparatus.

The content data may include sound data generated pulse sound, heartbeats and the like generated inside the body, or data representing internal body information such as image data or coordinate data representing electrocardiogram waveforms or temperature changes. The communications system 1 may thus be used as a remote medical system.

Moreover, in the above-described embodiments, the image data and sound data are described as examples of content data. However, the content data are not limited to the image data and sound data. The content data may be tactile data (touch data). In this case, the sense of touch experienced by a user via one terminal is transmitted to the other terminal. Further, the content data may be olfactory data (smell data). In this case, the sense of smell (odor) experienced by one terminal is transmitted to the other terminal. Moreover, the content data may at least one of the image data, the sound data, the tactile data, the olfactory data, and the like.

Note that each of the terminals 10 may be used for communications within the same room, communications between indoor and outdoor, and communications between outdoor and outdoor in addition to communications between two or more offices, and communications between different rooms within the same office. When the terminals 10 used outdoor may perform communications via wireless communications such as a mobile communications network. Further, the above-described embodiment has illustrated an example of the communications system 1 that implements the teleconferencing. However, the example implemented by the communications system 1 is not limited to the teleconferencing, and the example implemented by the communications system 1 may be general conversations between humans such as family members or friends, or one-way information presentation.

Applied Example

Figure 26:
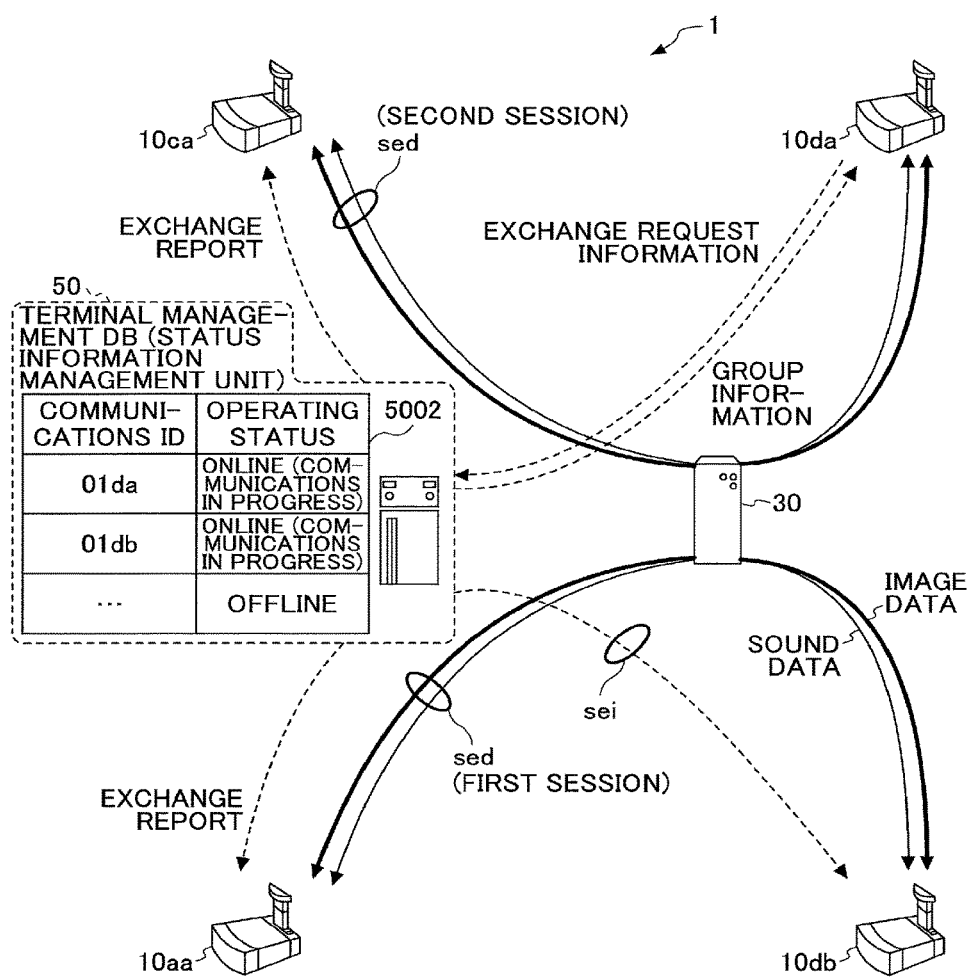
FIG. 26 is a conceptual diagram illustrating transmitting and receiving statuses of content data and various types of management information in the communications system.

Next, the following illustrates an applied example of the communications system 1 as another embodiment. Initially, an outline of processes and operations of the applied example of the communications system 1 is described with reference to FIG. 26. FIG. 26 is a conceptual diagram illustrating statuses of transmitting and receiving content data and various types of management information in the communications system 1.

The transmitter-receiver 51 (an example of a start request receiver) of the management system 50 (an example of a control system) receives exchange request information after a first content data session sed (an example of a first session) for transmitting the content data between the terminal 10db (an example of a first communications terminal) and the terminal 10aa (an example of a second communications terminal), and a second content data session sed (an example of a second session) for transmitting the content data between the terminal 10da (an example of a third communications terminal) and the terminal 10ca (an example of a fourth communications terminal) are established. Note that the exchange request information indicates information for requesting the exchange of the communications counterpart, and serves as information indicating a request for starting new communications between the terminals 10ca and 10db and new communications between terminals 10aa and 10da under the call control. When the transmitter-receiver 51 receives the exchange request information, the session controller 58 (an example of a session controller) establishes a content data session sed between the terminals 10aa and 10da and a content data session sed between the terminals 10ca and 10db, respectively, while the session controller 58 decouples the terminals 10db and 10aa from the first session and also decoupling the terminals 10da and 10ca from the second session. According to the above exchanges, the terminal 10da serving as an exchange request source may be able to take over the communications with the communication counterpart (the terminal 10aa) of the exchange request destination (the terminal 10db). That is, the communications counterpart of the communications may be exchanged before a series of communications between the terminal 10db and the terminal 10aa is completed. Hence, the terminal 10ca may be able to reduce the standby time for waiting for starting communications with the terminal 10db.

The terminal management DB 5002 (an example of a status information manager) of the management system 50 is configured to manage operating statuses (an example of status information) of the terminals (10da, 10db, . . . ), for each of the communications IDs of the terminals (10da, 10db, . . . ). The transmitter-receiver 51 (an example of a status information transmitter) is configured to transmit group information including the operating statuses of the terminals (10da, 10db, . . . ) to the terminal 10da. The transmitter-receiver 51 is also configured to receive exchange request information from the terminal 10da serving as a transmission destination of the group information. The terminal 10da may thus be able to select an exchange request destination based on each of the operating statuses of the terminals 10. In addition, the user may be able to quickly select the exchange request destination while speaking by using the terminal 10da.

The transmitter-receiver 51 (an example of a change information transmitter) transmits an exchange report indicating an exchange of an operator serving as the communications counterpart to each of the terminals 10aa and 10ca after the exchange request information has been received. The terminals 10aa and 10ca may thus be able to detect the exchange of operators.

The exchange report includes the communications ID (an example of identifier information) of the terminal serving as a new communication counterpart (10da or 10db). Hence, each of the terminals 10 that have received the exchange report may be able to transmit a communications start request for starting communications with a corresponding one of the terminals 10da and 10db serving as the new communications counterparts.

The transmitter-receiver 21 (an example of a status information receiver) of the terminal 10da is configured to receive the group information including the operating statuses of the terminals transmitted from the management system 50. The display controller 24 (antenna example of a display controller) of the terminal 10da is configured to control display of icons (example of information) indicating respective operating statuses of the terminals 10 based on the group information. The operation input receiver 12 (an example of a selection receiver) is configured to receive a new communications counterpart selected with respect to the exchange request destination, that is, the terminal 10ca, based on the selected one of the displayed icons. The transmitter-receiver 21 (an example of a transmitter) of the terminal 10da is configured to transmit the communications ID of the selected new communications counterpart to the management system 50. The terminal 10da may thus be able to select the exchange request destination based on the operating statuses of the terminals 10 serving as the exchange request destination candidates.

The transmitter-receivers 21 (an example of a changed information receiver) of the terminals (10aa and 10ca) are configured to receive the exchange reports transmitted from the management system 50. The displays (120aa and 120ca) (an example of an output unit) of the terminals (10aa and 10ca) display configuration information indicating that the operators serving as the communications counterparts will be exchanged based on the exchange reports. The terminals (10*aa* and 10*ca*) may thus be able to detect that the operators may be changed based on the displayed information.

Figure 27:
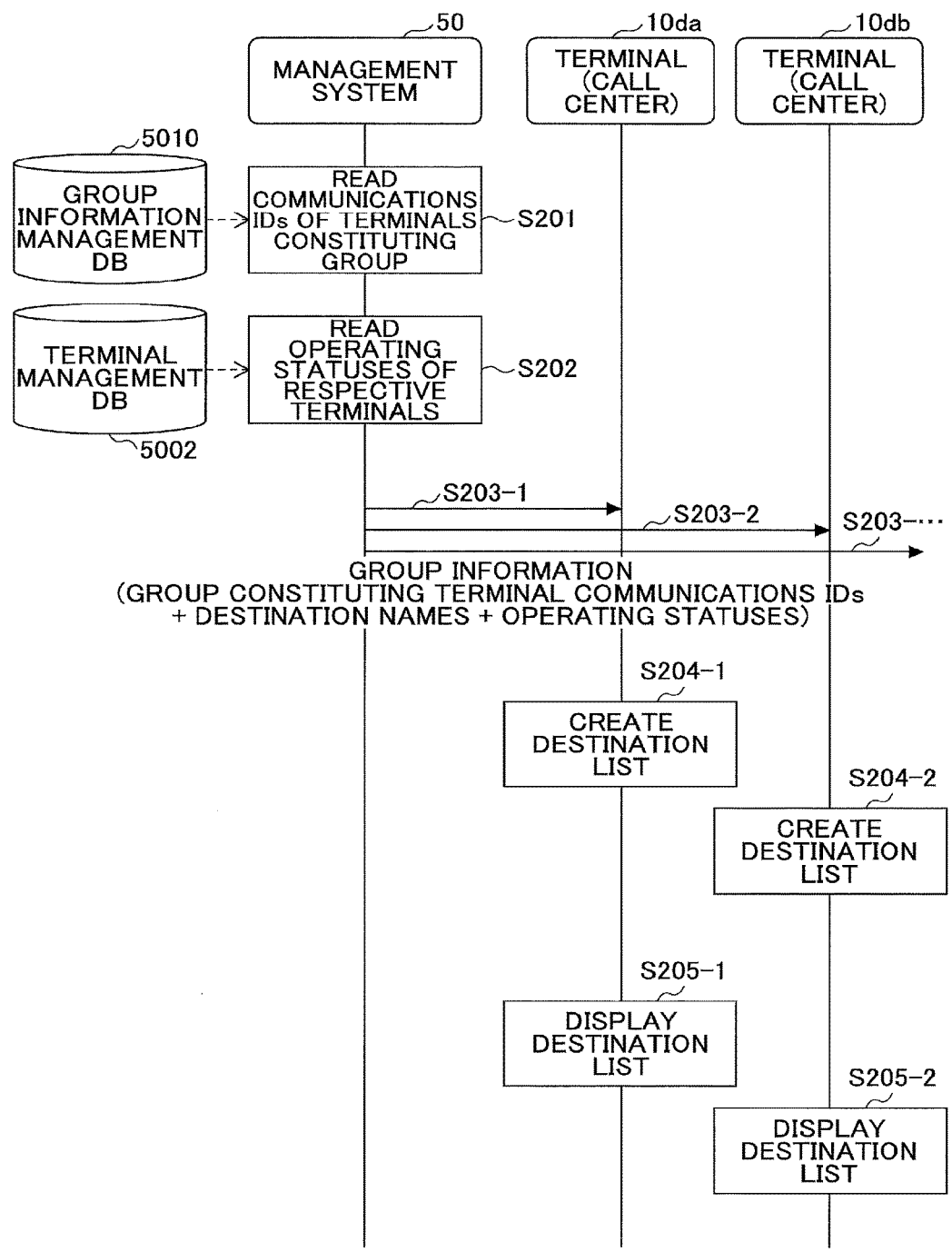
FIG. 27 is a sequence diagram illustrating a process of reporting an operating status of a terminal.

Next, a detailed description is given of processes and operations of the system, the terminal, and the apparatus that constitute the communications system 1 according to the applied example. Initially, an illustration is given, with reference to FIG. 27, of a process of reporting the operating status of each of the terminals constituting a call center. FIG. 27 is a sequence diagram illustrating a process of reporting the operating statuses of the terminals. When operating statuses of the terminals 10 constituting the call center are changed in steps S4 and S76 among the operating statuses managed in the terminal management table (see FIG. 8B), the management system 50 starts a process illustrated in FIG. 27.

Initially, the storage-reader 59 is configured to read the communications IDs (e.g., "01*da*" and "01*db*") of the terminals of a group (e.g., the "call center") to which the terminal 10 (e.g., the terminal da) having the operating status changed belongs by referring to the group information management table illustrated in FIG. 9C. The storage-reader 59 searches the terminal management table (see FIG. 8B) by the communications IDs read in step S201 as search keys to read the corresponding destination name and the operating status (e.g., "the DA terminal at the call center" and "online (communications in progress)") (step S202). The transmitter-receiver 51 subsequently transmits group information including the communications IDs read in step S201, the destination names and operating statuses read in step S202 corresponding to the read communications IDs to the terminals 10 having the operating status being "online (communications available)" or "online (communications in progress)" among the terminals included in the group (steps S203-1, S203-2, . . . ).

Figure 28:
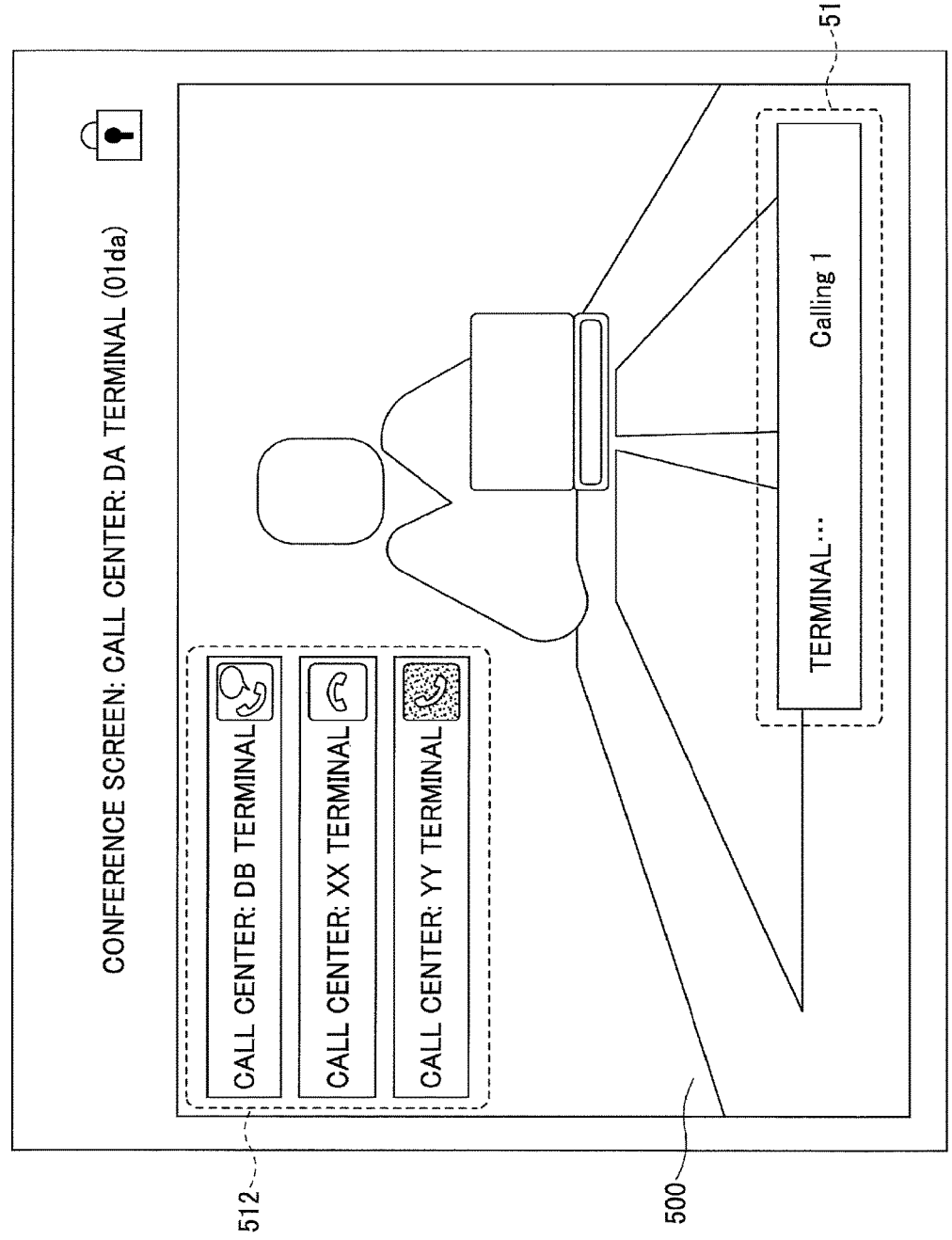
FIG. 28 is a diagram illustrating a display example of a destination list.

The creators 23 of the terminals 10 that have received the group information create respective destination lists including the destination names indicating terminals included in the group and icons corresponding to the operating statuses based on the group information (steps S204-1, S204-2, . . . ). The display controllers 24 display respective destination lists such as a destination list 512 illustrated in FIG. 28 on the displays 120 (steps S205-1, S205-2, . . . ). FIG. 28 is a diagram illustrating a display example of the destination list. Note that the respective icons of the destination list 512 illustrated in FIG. 28 are similar to the icons 1100-4*a* to 1100-4*c* in FIG. 15, and a description of the icons of the destination list 512 is thus omitted from the specification.

Figure 29:
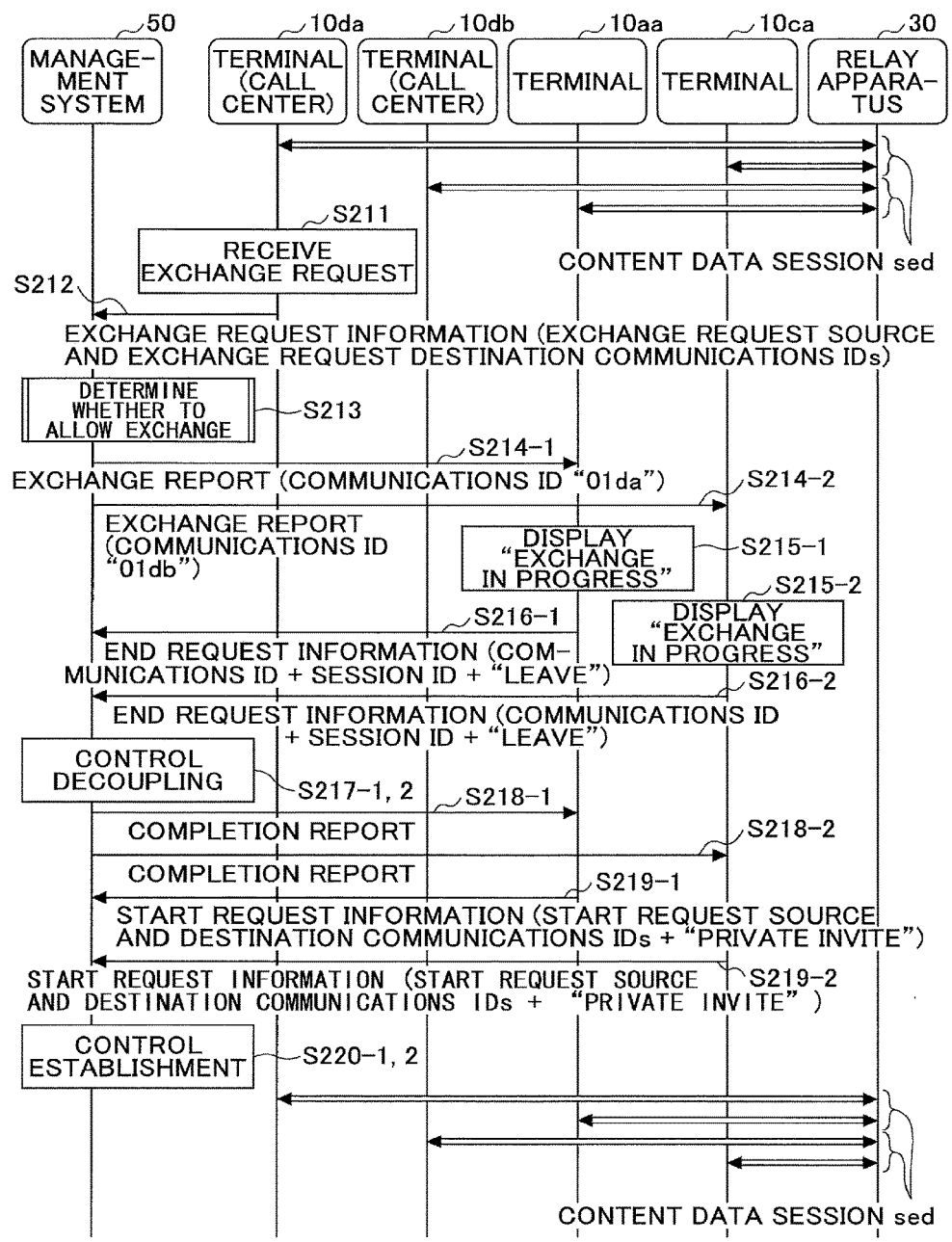
FIG. 29 is a sequence diagram illustrating a process of exchanging terminals 10 of the communications counterparts.

The following describes a process of exchanging operators with reference to FIG. 29. FIG. 29 is a sequence diagram illustrating a process of exchanging terminals 10 of the communications counterparts. At the start of the process, a content data session sed is established between the terminal 10*db* and the terminal 10*aa* via the relay apparatus 30, a content data session sed is also established between the terminal 10*da* and the terminal 10*ca* via the relay apparatus 30. The destination list 512 illustrated in FIG. 28 is displayed on each of the displays 120*da* and 120*db* of the group (call center) constituting terminals 10*da* and 10*db*.

The operator da of the call center terminal 10*da* selects an icon representing one of the operating statuses "online (communications available)" and "online (communications in progress)" of the terminal 10 from the destination list 512 illustrated in FIG. 28, as the exchange request destination, namely, a new communications counterpart for the terminal 10*ca*. In this example, the illustration is given on the basis of assumption where the icon representing the operating status "online (communications in progress)" of the terminal 10*db* is selected. When the above icon is selected, the operation input receiver 12 of the terminal 10*da* receives an exchange request for mutually exchanging the communications counterparts between the own terminal 10*da* and the selected terminal 10*db*. The transmitter-receiver 21 subsequently transmits exchange request information indicating the exchange request to the management system 50 (step S212). The exchange request information includes the communications ID "01*da*" of the terminal da serving as the exchange request source, and the communications ID "01*db*" of the terminal 10*db* serving as the exchange request destination.

Figure 30:
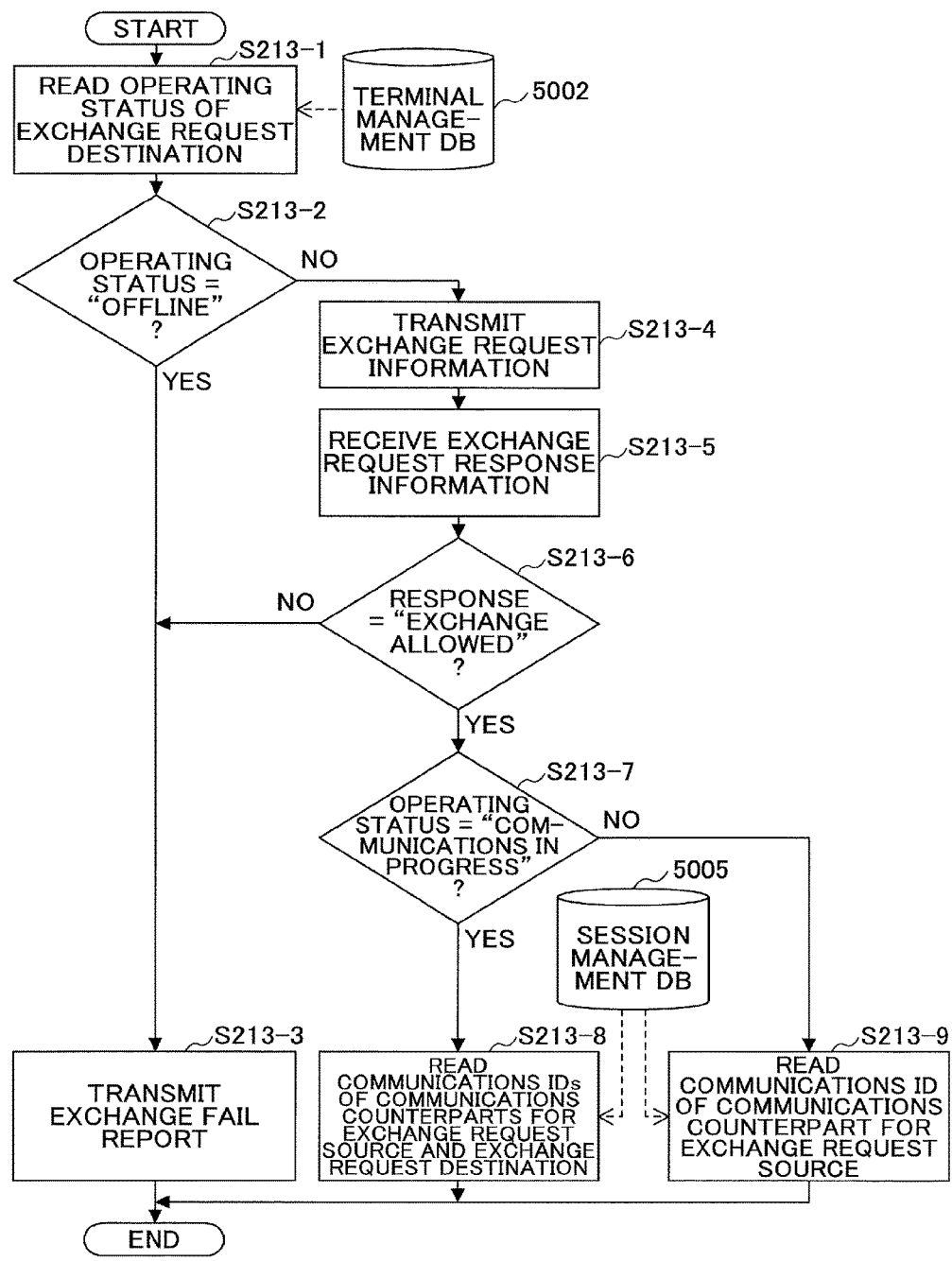
FIG. 30 is a flowchart illustrating a process of determining whether to allow an exchange.

In the management system 50, the exchange request information is handled as a request for decoupling the content data session sed in which the terminal 10*da* serving as the exchange request source participates, and a request for decoupling the content data session sed in which the terminal 10*db* serving as the exchange request destination participates, and the exchange request information is also handled as a request for establishing a content data session sed between the terminal 10*ca* and the terminal 10*db*, and a request for establishing a content data session sed between the terminal 10*aa* and the terminal 10*da*. When the transmitter-receiver 51 of the management system 50 receives the exchange request information, the management system 50 determine whether to allow the requested exchange (step S213). The process of step S213 is illustrated with reference to FIG. 30. FIG. 30 is a sequence diagram illustrating a process of determining whether to allow the exchange of the communications counterparts.

Initially, the storage-reader 59 searches the terminal management table (see FIG. 8B) by the communications ID of the terminal 10*db* serving as the exchange request destination included in the exchange request information to read the operating status of the terminal 10*db* (step S213-1). The session controller 58 subsequently determines whether the read operating status of the terminal db is "offline" (step S123-2). When the session controller 58 determines that the read operating status of the terminal db is "offline" (YES in step S123-2), the transmitter-receiver 51 transmits an exchange fail report indicating that the requested change is not allowable to the terminal 10*da* serving as the exchange request source (step S213-3). For example, when the operating status of the terminal 10*db* is recently changed to "offline", it is not possible to execute the requested exchange. The management system 50 thus determines that the requested exchange is not allowable and ends the process.

When the session controller 58 determines that the read operating status of the terminal db is not "offline" (NO in step S123-2), the transmitter-receiver 51 transmits exchange request information indicating the exchange request to the terminal 10*db* serving as the exchange request destination (step S213-4). The terminal 10*db* serving as a transmission destination of the exchange request information receives an input of a response to the request via the operation input receiver 12. The transmitter-receiver 21 of the terminal 10*db* transmits exchange request response information indicting the received input to the management system 50.

The transmitter-receiver 51 of the management system 50 receives the exchange request response information transmitted from the terminal 10*db* (step S213-5). The session controller 58 subsequently determines whether the received exchange request response information is "exchange allowed" (step S213-6). When the exchange request response information indicates other than "exchange allowed" such as "exchange rejected" (NO in step S213-6), the transmitter-receiver 51 transmits the exchange fail report to the terminal 10*da* serving as the exchange request source (step S213-3).

When the exchange request response information indicates "exchange allowed" (YES in step S213-6), the management system 50 continues performing the requested exchange process. In this case, the session controller 58 determines whether the operating status read in step S213-2 is "ONLINE (COMMUNICATIONS in progress)" (step S213-7). When the session controller 58 determines that the operating status is "ONLINE (COMMUNICATIONS in progress)" (YES in step S213-7), the storage-reader 59 reads the communications IDs of the current communications counterparts for the exchange request source and the exchange request destination from the session management table (see FIG. 8E) (step S213-8). In this case, the storage-reader 59 searches the session management table (see FIG. 8E) by the communications ID "01*da*" of the terminal 10*da* serving as the exchange request source as a search key to read the session ID of the content data session sed in which the terminal 10*da* participates. The storage-reader 59 subsequently searches the session management table by the read session ID as a search key to read the communications IDs of the terminals attending the session. Note that among the read communications IDs, the communications IDs other than the communications ID of the exchange request source serve as the communications counterparts for the exchange request source. The process of reading the communications IDs of the communications counterparts for the exchange request destination is similar to the process of reading the communications IDs of the communications counterparts for the exchange request source, and a duplicated illustration is thus omitted from the specification.

When the session controller 58 determines that the operating status is not "ONLINE (COMMUNICATIONS in progress)" but "ONLINE (COMMUNICATIONS available)" (NO in step S213-7), the storage-reader 59 reads the communications ID of the current communications counterpart for the exchange request source from the session management table (see FIG. 8E) (step S213-9). The process of reading the communications ID of the current communications counterpart for the exchange request source is similar to the process of reading the communications ID of the current communications counterpart for the exchange request source in step S213-8, and a duplication illustration is thus omitted from the specification.

Subsequently, an illustration is given of a case where the exchange request is allowed by referring back to FIG. 29. The transmitter-receiver 51 transmits the exchange report indicating the exchange of the communications counterparts to each of the terminals 10*aa* and 10*ca* of the current communications counterparts having the communications IDs read in step S213-8 or S213-9 (steps S214-2 and S214-2). The exchange report includes the communications ID "01*db*" or "01*da*" of the terminal 10*db* or 10*da* serving as the corresponding new communications counterpart for the transmission destination of the exchange report.

The exchange report is received by the transmitter-receiver 21 of each of the terminals 10*aa* and 10*ca*. When the transmitter-receiver 21 receives the exchange report, the display controller 24 of each of the terminals 10*aa* and 10*ca* outputs a message indicating that the operators serving as communications counterparts are currently being exchanged to the corresponding display (120*aa* or 120*ca*) (step S215-1 or S215-2). Note that FIG. 31 is a diagram illustrating a display example of the screen of the display 120*aa* in step S215-1.

The transmitter-receiver 11 of each of the terminals 10*aa* and 10*ca* that have received the exchange report automatically transmits end request information indicating ending the communications with the corresponding one of the current communications counterparts (10*db* and 10*da*) to the management system (step S216-1 and S216-2). The end request information each includes the communications ID "01*aa*" or "01*ca*" of the terminal (10*aa* or 10*ca*) serving as the end request source, the session ID for identifying the content data session that the terminal (10*aa* or 10*ca*) currently attends, and the management information "LEAVE" indicating an end request.

The session controller 58 of the management system 50 that has received the end request information starts controlling decoupling of the content data session sed between the terminal 10*aa* and the terminal 10*db*, and decoupling of the content data session sed between the terminal 10*ca* and the terminal 10*da* (step S217-1 or S217-2). In this case, the transmitter-receiver 51 of the management system 50 transmits a decoupling request for decoupling the session from the terminals 10*aa* and 10*db* to the relay apparatus 30, or transmits a decoupling request for decoupling the session from the terminals 10*ca* and 10*da* to the relay apparatus 30, based on the control of the session controller 58. The manager 53 changes, based on the control of the session controller 58, the operating statuses of the terminals 10*aa* and 10*db* to "NONE", or the operating statuses of the terminals 10*ca* and 10*da* to "NONE", in accordance with the status transition rule illustrated in FIG. 10B. Note that a method for ending the content data session sed is not limited to the above-described method. For example, the content data session sed may end by following a method disclosed in Japanese Unexamined Patent Application Publication No. 2012-50063.

When decoupling of both the content data sessions sed is completed, the transmitter-receiver 51 transmits a completion report indicating that the process based on the end request has been completed to each of the terminals 10*aa* and 10*ca* serving as the request source (steps S218-1 and S218-2). The transmitter-receiver 11 of each of the terminals 10*aa* and 10*ca* that have received the completion report automatically transmits start request information indicating a request for starting communications with new communications counterparts (steps S219-1 and S219-2). The start request information processing apparatus each includes the communications ID of the own terminal 10 serving as the start request source, the communications ID of the corresponding new communications counterpart received in step S214-1 or step S214-2 as the destination, and the management information "PRIVATE INVITE" indicating a request for starting communications having attendance limitation.

When the transmitter-receiver 51 of the management system 50 has received each set of the start request information, the session controller 58 controls establishing a content data session sed between the terminal 10*aa* and the terminal 10*da*, and controls establishing a content data session sed between the terminal 10*ca* and the terminal 10*db* in manners similar to the processes in steps S76 to S82 (steps S220-1 and 220-2). In this case, the transmitter-receiver 51 of the management system 50 transmits to the terminals 10*aa* and 10*da* relay apparatus coupling information for newly coupling to the relay apparatus 30, or transmits to the terminals 10*ca* and 10*db* relay apparatus coupling information for coupling to the relay apparatus 30, based on the control of the session controller 58. The terminals 10*aa* and 10*da* are coupled to the relay apparatus 30, and the terminals 10*ca* and 10*db* are coupled to the relay apparatus 30. The transmitter-receiver 51 transmits to the relay apparatus 30 a relay start request for starting relay of the content data between the terminal 10*aa* and the terminal 10*da* and a relay start request for starting relay of the content data between the terminal 10*ca* and the terminal 10*db*. The manager 53 changes, based on the control of the session controller 58, the operating statuses of the terminals 10*aa* and 10*da* to "PRIVATE BUSY", or the operating statuses of the terminals 10*ca* and 10*db* to "PRIVATE BUSY", in accordance with the status transition rule illustrated in FIG. 10B. Note that a method for ending the content data session sed is not limited to the above-described method. For example, the content data session sed may end by following the method disclosed in Japanese Unexamined Patent Application Publication No. 2012-50063. When content data sessions sed are newly established, the content data may be transmitted or received between the terminal 10*aa* and the new counterpart terminal 10*da*, and also between the terminal 10*ca* and the new counterpart terminal 10*db*.

Supplementary Explanation of Applied Example

In the configuration of the above-described embodiment, the management system 50 transmits group information to the operators' terminals 10 constituting the group (the call center) for allowing the operators' terminals 10 to select the exchange request destination; however, the invention is not limited to this configuration. For example, the management system 50 may transmit the group information to the terminal 10*aa* of the user serving as the communication counterparts for the operator's terminal 10 for allowing the user's terminal 10 to select the exchange request destination. In this case, the transmitter-receiver 51 of the management system 50 transmits the group information to the terminal 10*aa* in step S203. The terminal 10*aa* subsequently executes steps S211 and S212 to implement the above process.

According to at least one embodiment, it is possible to reduce standby time of a fourth communications terminal to start new communications with a first communications terminal after a first session for transmitting information between the first communications terminal and a second communications terminal and a second session for transmitting information between a third communications terminal and the fourth communications terminal are established.

Further, the present invention is not limited to these embodiments and examples described above, but various variations and modifications may be made without departing from the scope of the present invention.

What is claimed is:

1. A control system, comprising:
   first processing circuitry configured to
      control establishing a session for transmitting information between communications terminals, in response to a request from one of the communications terminals, and
      receive, after a first session for transmitting information between a first communications terminal and a second communications terminal and a second session for transmitting information between a third communications terminal and a fourth communications terminal have been established, a communications start request for starting communications between the first communications terminal and the fourth communications terminal, wherein
      when the first processing circuitry receives the communications start request, the first processing circuitry decouples each of the first session and the second session and establishes a third session for transmitting information between the second communication terminal and the third communications terminal and a fourth session for transmitting information between the first communication terminal and the fourth communications terminal.

2. The control system according to claim 1, wherein the first processing circuitry is further configured to
   manage status information indicating statuses of the communications terminals, for each of the communications terminals,
   cause a first transmitter to transmit the status information of the communications terminals to a destination communication terminal, and
   receive the communications start request from the destination communications terminal serving as a transmission destination of the status information.

3. The control system according to claim 1, further comprising:
   a transmitter configured to transmit, to each of the second communications terminal and the fourth communications terminal, change information indicating that a communications counterpart is changed, when the processing circuitry receives the communications start request from the third communications terminal.

4. The control system according to claim 3, wherein
   the change information transmitted to the second communications terminal by the transmitter includes identifier information of the third communications terminal, and the change information transmitted to the fourth communications terminal by the transmitter includes identifier information of the first communications terminal.

5. A communications terminal, comprising:
   a receiver coupled to the control system according to claim 2, and configured to receive the status information of each of the communications terminals, which is transmitted by the control system;
   second processing circuitry configured to
      control display of information indicating a status of each of the communications terminals based on the status information of a corresponding one of the communications terminals, and
      receive selection of the communications terminal based on the displayed information, and
   a second transmitter configured to transmit, to the control system, identifier information of the communications terminal, wherein
   when the communications terminal corresponds to the third terminal, the second processing circuitry receives selection of the first terminal as a communications terminal for establishing a new session with the fourth terminal while establishing the second session with the fourth terminal, the first terminal having established the first session with the second communications terminal.

6. A communications system, comprising:
   the control system according to claim 1; and
   the first communications terminal.

7. A control method for use in a control system, the control system controlling establishment of a session for transmitting information between a communications terminal and other communications terminals, in response to a request from the communications terminal, the control method comprising:
   receiving, after a first session for transmitting information between a first communications terminal and a second communications terminal and a second session for transmitting information between a third communications terminal and a fourth communications terminal have been established, a communications start request for starting communications between the first communications terminal and the fourth communications terminal; and decoupling each of the first session and the second session when receiving the communications start request, and establishing a third session for transmitting information between the second communication terminal and the third communications terminal and a fourth session for transmitting information between the first communication terminal and the fourth communications terminal.

8. A non-transitory computer-readable recording medium storing a program for causing a computer to function as the control system according to claim 1.

9. A non-transitory computer-readable recording medium storing a program for causing a computer to function as the communications terminal according to claim 5.

* * * * *